(12) United States Patent
Collette et al.

(10) Patent No.: US 6,787,094 B2
(45) Date of Patent: *Sep. 7, 2004

(54) SLEEVE MOLDING

(75) Inventors: Wayne N. Collette, Merrimack, NH (US); Suppayan M. Krishnakumar, Nashua, NH (US)

(73) Assignee: Continental PET Technologies, Inc., Toledo, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/209,896

(22) Filed: Aug. 2, 2002

(65) Prior Publication Data

US 2003/0001311 A1 Jan. 2, 2003

Related U.S. Application Data

(63) Continuation of application No. 08/981,467, filed as application No. PCT/US96/11413 on Jul. 8, 1996, now Pat. No. 6,428,737, and a continuation-in-part of application No. 08/534,126, filed on Sep. 26, 1995, now Pat. No. 6,217,818, which is a continuation-in-part of application No. 08/499,570, filed on Jul. 7, 1995, now abandoned.

(51) Int. Cl.[7] .......................... B29C 45/14; B29C 45/16
(52) U.S. Cl. .................. 264/513; 264/537; 264/255; 264/328.8; 264/328.16; 264/904
(58) Field of Search ............................... 264/509, 510, 264/513, 537, 255, 328.8, 904; 425/129.1, 130, 522, 523, 534

(56) References Cited

U.S. PATENT DOCUMENTS

| 3,086,249 A | 4/1963 | Nelson et al. .................. 18/55 |
| 3,224,043 A | 12/1965 | Lameris et al. |
| 3,943,219 A | 3/1976 | Aoki ............................ 264/97 |
| 4,293,520 A | 10/1981 | Akutsu ........................ 264/513 |
| 4,307,137 A | 12/1981 | Ota et al. ..................... 264/513 |
| 4,330,257 A | 5/1982 | Rees et al. .................... 425/556 |

(List continued on next page.)

FOREIGN PATENT DOCUMENTS

| EP | 0302117 A1 | 2/1989 |
| FR | A 2538297 | 6/1984 |
| GB | A 1482956 | 8/1977 |
| GB | A 2011309 | 7/1979 |
| JP | A 61-002519 | 5/1986 |
| JP | A 61185417 | 8/1986 |
| JP | 5-73568 | 10/1993 |
| WO | WO 95/00325 | 1/1995 |
| WO | WO 95/07219 | 3/1995 |
| WO | WO 95/22451 | 8/1995 |

*Primary Examiner*—Angela Ortiz
(74) *Attorney, Agent, or Firm*—Finnegan, Henderson, Farabow, Garrett & Dunner, LLP

(57) ABSTRACT

Sleeve molding apparatus and methods for making multi-layer injection molded plastic articles in successive mold cavities. In a first molding step, an inner sleeve is molded on a core in a first mold cavity, which may comprise a full body length sleeve or only a partial sleeve, such as an upper neck finish portion. The sleeve and core are withdrawn from the first mold cavity while the sleeve is still warm, and transferred without substantial delay to a second mold cavity for injection molding an outer layer which bonds to the inner sleeve. By transferring the sleeve at an elevated temperature into the second mold cavity, an improved bond is formed between the inner sleeve and outer layer which resists separation during a later reheat stretch blow molding step, and/or in use of the resulting article. In a preferred embodiment, a pasteurizable beer container is provided having a finish-only sleeve of a PEN polymer. In a second embodiment, a returnable and refillable water container is provided having a full-length body sleeve of a PEN polymer. A multi-station injection molding apparatus is provided having a transfer mechanism, such as a rotatable turret or reciprocating shuttle, for cost-effective manufacture of preforms simultaneously in multiple cavity sets.

47 Claims, 16 Drawing Sheets

U.S. PATENT DOCUMENTS

| | | |
|---|---|---|
| 4,342,895 A | 8/1982 | Krishnakumar et al. . 219/10.43 |
| 4,347,209 A | 8/1982 | Suzuki .................... 264/250 |
| 4,396,816 A | 8/1983 | Krishnakumar et al. . 219/10.43 |
| 4,398,642 A | 8/1983 | Okudaira et al. ........... 215/1 C |
| 4,407,651 A | 10/1983 | Beck et al. .................. 432/11 |
| 4,413,974 A | 11/1983 | Kontz ..................... 425/523 |
| 4,449,913 A | 5/1984 | Krishnakumar et al. .... 425/548 |
| 4,476,364 A | 10/1984 | Prevot et al. ............ 219/10.81 |
| 4,507,258 A | 3/1985 | Aoki ....................... 264/255 |
| 4,589,559 A | 5/1986 | Hayashi et al. ............ 215/1 C |
| 4,590,021 A | 5/1986 | Ota et al. ..................... 264/25 |
| 4,609,516 A | 9/1986 | Krishnakumar et al. .... 264/255 |
| 4,715,504 A | 12/1987 | Chang et al. .............. 215/1 C |
| 4,731,513 A | 3/1988 | Collette ................. 219/10.43 |
| 4,744,742 A | 5/1988 | Aoki ..................... 425/126.1 |
| 4,786,455 A | 11/1988 | Krishnakumar et al. .... 264/237 |
| 4,830,811 A | 5/1989 | Aoki ........................ 264/513 |
| 4,885,121 A | 12/1989 | Patel ........................ 264/255 |
| 4,923,723 A | 5/1990 | Collette et al. ............ 428/35.7 |
| 4,933,135 A | 6/1990 | Horwege et al. ........... 264/521 |
| 5,030,406 A | 7/1991 | Sorensen .................... 264/255 |
| 5,032,341 A | 7/1991 | Krishnakumar et al. .... 264/255 |
| 5,034,177 A | 7/1991 | Niimi et al. ................ 264/331 |
| 5,049,345 A | 9/1991 | Collette et al. ............. 264/255 |
| 5,141,695 A | 8/1992 | Nakamura ................. 264/255 |
| 5,221,507 A | 6/1993 | Beck et al. ................. 264/255 |
| 5,354,532 A | 10/1994 | Nakai et al. ................ 264/259 |
| 5,443,766 A | 8/1995 | Slat et al. ..................... 264/37 |
| 5,447,766 A | 9/1995 | Orimoto et al. ......... 428/36.91 |
| 5,492,467 A | 2/1996 | Hume et al. ................ 425/549 |
| 5,571,470 A | 11/1996 | Plester ....................... 264/255 |
| 5,599,598 A | 2/1997 | Valyi ........................ 428/35.7 |
| 5,628,957 A | 5/1997 | Collette et al. ............. 264/512 |
| 5,804,016 A | 9/1998 | Schmidt et al. ............. 264/513 |

SLEEVE MOLDING

RELATED APPLICATIONS

This is a Continuation Application under 37 C.F.R. §1 53(b) of prior application Ser. No. 08/981,467 filed Mar. 17, 1998 now U.S. Pat. No. 6,428,737 of Wayne N. Collette and Suppayan M. Krishnakumar for SLEEVE MOLDING, which is a continuation of PCT/US96/11413 filed Jul. 8, 1996, and a continuation-in-part of U.S. Ser. No. 08/534,126 filed Sep. 26, 1995 (now U.S. Pat. No. 6,217,818 dated Apr. 17, 2001), which is a continuation-in-part of U.S. Ser. No. 08/499,570 filed Jul. 7, 1995 (now abandoned), all of which are incorporated herein by reference.

FIELD OF THE INVENTION

The present invention relates to a method and apparatus for making multilayer injection-molded plastic articles such as preforms, wherein the successive molding of an inner sleeve and outer layer enables cost-effective production of multilayer preforms for pasteurizable, hot-fillable, and returnable and refillable beverage containers.

BACKGROUND OF THE INVENTION

There is described in U.S. Pat. No. 4,609,516 to Krishnakumar et al. a method for forming multilayer preforms in a single injection mold cavity. In that method, successive injections of different thermoplastic materials are made into the bottom of the mold cavity. The materials flow upwardly to fill the cavity and form for example a five-layer structure across the sidewall. This five-layer structure can be made with either two materials (i.e., the first and third injected materials are the same) or three materials (i.e., the first and third injected materials are different). Both structures are in widespread commercial use for beverage and other food containers.

An example of a two-material, five-layer (2M, 5L) structure has inner, outer and core layers of virgin polyethylene terephthalate (PET), and intermediate barrier layers of ethylene vinyl alcohol (EVOH). An example of a three-material, five-layer (3M, 5L) structure has inner and outer layers of virgin PET, intermediate barrier layers of EVOH, and a core layer of recycled or post-consumer polyethylene terephthalate (PC-PET). Two reasons for the commercial success of these containers are that: (1) the amount of relatively expensive barrier material (e.g., EVOH) can be minimized by providing very thin intermediate layers; and (2) the container resists delamination of the layers without the use of adhesives to bond the dissimilar materials. Also, by utilizing PC-PET in the core layer, the cost of each container can be reduced without a significant change in performance.

Although the above five-layer, and other three-layer (see for example U.S. Pat. No. 4,923,723) structures work well for a variety of containers, as additional high-performance and expensive materials become available there is an on-going need for processes which enable close control over the amount of materials used in a given container structure. For example, polyethylene naphthalate (PEN) is a desirable polyester for use in blow-molded containers. PEN has an oxygen barrier capability about five times that of PET, and a higher heat stability temperature—about 250° F. (120° C.) for PEN, compared to about 175° F. (80° C.) for PET. These properties make PEN useful for the storage of oxygen-sensitive products (e.g., food, cosmetics, and pharmaceuticals), and/or for use in containers subject to high temperatures (e.g., refill or hot-fill containers). However, PEN is substantially more expensive than PET and has different processing requirements: Thus, at present the commercial use of PEN is limited.

Another high-temperature application is pasteurization—a pasteurizable container is filled and sealed at room temperature, and then exposed to an elevated temperature bath for about ten minutes or longer. The pasteurization process initially imposes high temperatures and positive internal pressures, followed by a cooling process which creates a vacuum in the container. Throughout these procedures, the sealed container must resist deformation so as to remain acceptable in appearance, within a designated volume tolerance, and without leakage. In particular, the threaded neck finish must resist deformation which would prevent a complete seal.

A number of methods have been proposed for strengthening the neck finish. One approach is to add an additional manufacturing step whereby the neck finish, of the preform or container, is exposed to a heating element and thermally crystallized. However, this creates several problems. During crystallization, the polymer density increases, which produces a volume decrease; therefore, in order to obtain a desired neck finish dimension, the as-molded dimension must be larger than the final (crystallized) dimension. It is thus difficult to achieve close dimensional tolerances and, in general, the variability of the critical neck finish dimensions after crystallization are approximately twice that prior to crystallization. Another detriment is the increased cost of the additional processing step, as it requires both time and the application of energy (heat). The cost of producing a container is very important because of competitive pressures and is tightly controlled.

An alternative method of strengthening the neck finish is to crystallize select portions thereof, such as the top sealing surface and flange. Again, this requires an additional heating step. Another alternative is to use a high $T_g$ material in one or more layers of the neck finish. This also involves more complex injection molding procedures and apparatus.

Thus, it would be desirable to provide an injection-molded article such as a preform which incorporates certain high-performance materials, and a commercially acceptable method of manufacturing the same.

SUMMARY OF THE INVENTION

The present invention is directed to a method and apparatus for making a multilayer injection-molded plastic article, such as a preform, which is both cost-effective and enables control over the amounts of materials used in the various layers and/or portions of the article.

According to a method/embodiment of the invention, an inner sleeve is molded on a first core positioned in a first mold cavity. The inner sleeve is only partially cooled before being transferred while still at an elevated temperature to a second mold cavity where an outer layer is molded over the inner sleeve. By providing the inner sleeve in the second mold cavity at the elevated temperature, bonding between the inner sleeve and outer layer is enabled during the second molding step, such that layer separation is avoided in the final molded article. The inner sleeve may comprise a full-length inner sleeve, extending substantially the full length of the article, or alternatively may comprise only an upper portion of the article, in which case the outer layer comprises a lower portion of the article and there is some intermediate portion in which the outer layer is bonded to the inner sleeve.

In one embodiment, a first thermoplastic material is used to make an inner sleeve which comprises a neck finish portion of the preform. The first thermoplastic material is preferably a thermal resistant material having a relatively high $T_g$, and/or forms a crystallized neck finish during the first molding step. In contrast, a lower body portion of the preform is made of a second thermoplastic material having a relatively lower thermal resistance and/or lower crystallization rate compared to the first material, and forms a substantially amorphous body-forming portion of the preform. In one example, by achieving crystallization in the neck finish during the first molding step, the initial and finish dimensions are the same so that the dimensional variations caused by the prior art post-molding crystallization step (and the expense thereof) are eliminated. Also, a higher average level of crystallization can be achieved in the finish, by utilizing the higher melt temperatures and/or elevated pressures of the molding process.

In another embodiment, a full-length body sleeve is provided made of a high-performance thermoplastic resin, such as PEN homopolymer, copolymer or blend. The PEN inner sleeve provides enhanced thermal stability and reduced flavor absorption, both of which are useful in refill applications. The amount of PEN used is minimized by this process which enables production of a very thin inner sleeve layer, compared to a relatively thick outer layer (made of one or more lower-performance resins).

Another aspect of the invention is an apparatus for the cost-effective manufacture of such preforms. The apparatus includes at least one set of first and second molding cavities, the first mold cavity being adapted to form the inner sleeve and the second mold cavity adapted to form the outer layer. A transfer mechanism includes at least one set of first and second cores, wherein the cores are successively positionable in the first and second molding cavities. In one cycle, a first core is positioned in a first mold cavity while a first inner sleeve is molded on the first core, while a second core, carrying a previously-molded second inner sleeve, is positioned in a second mold cavity, for molding a second outer layer over the second inner sleeve. By simultaneously molding in two sets of cavities, an efficient process is provided. By molding different portions/layers of the articles separately in different cavities, different temperatures and/or pressures may be used to obtain different molding conditions and thus different properties in the different portions/layers. For example, it is possible to mold the crystallized neck finish portion in a first cavity, while molding a substantially amorphous outer layer in the second cavity.

The resulting injection-molded articles, and/or expanded injection-molded articles, may thus have a layer structure which is not obtainable with prior processes.

The following chart provides temperature/time/pressure ranges for certain preferred embodiments, which are described in greater detail in the following sections:

a) for an inner sleeve of PEN polymer material and an outer layer of PET polymer material

| | range (on the order of) |
|---|---|
| first molding step: | |
| core temperature | 5–80° C. |
| mold cavity temperature | 40–120° C. |
| melt temperature | 275–310° C. |
| cycle time | 4–8 seconds |
| outer surface temperature of sleeve | 60–120° C. |
| second molding step: | |
| core temperature | 5–80° C. |
| mold cavity temperature | 5–60° C. |
| cycle time | 20–50 seconds |
| pressure | 8000–15,000 psi | b) for an inner sleeve of crystallized polyester material and an outer layer of PET polymer material

| | range (on the order of) |
|---|---|
| first molding step: | |
| core temperature | 5–60° C. |
| mold cavity temperature | 80–150° C. |
| melt temperature | 270–310° C. |
| cycle time | 5–8 seconds |
| outer surface temperature of sleeve | 80–140° C. |
| second molding step: | |
| core temperature | 5–60° C. |
| mold cavity temperature | 5–60° C. |
| cycle time | 20–35 seconds |
| pressure | 8000–15,000 psi |

The present invention will be more particularly set forth in the following detailed description and accompanying drawings.

BRIEF DESCRIPTION OF THE DRAWINGS

FIG. 2A shows the cavities/cores in a closed position and FIG. 2B shows the cavities/cores in an open position;

FIG. 6A shows the shuttle in a first closed position in first and second mold cavities; FIG. 6B shows the shuttle in a second open position after retraction from the first and second mold cavities; FIG. 6C shows the shuttle in a second open position beneath the second and third mold cavities; and FIG. 6D shows the shuttle in a fourth closed position in the second and third mold cavities;

DETAILED DESCRIPTION

First Preform Embodiment (Refillable Water)

Figure 1A:
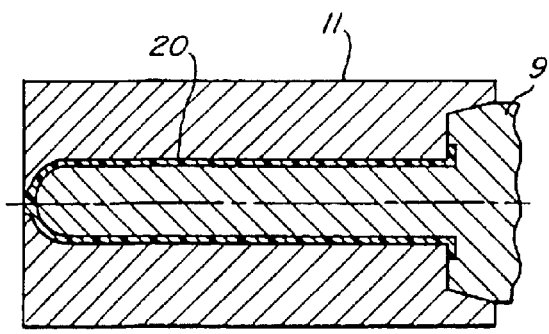
FIGS. 1A–1D are schematic illustrations of a first method embodiment of the present invention for making a preform having a full-length inner sleeve and a single outer layer.
Figure 1B:
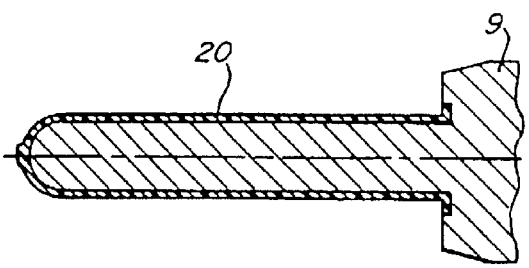
Figure 1C:
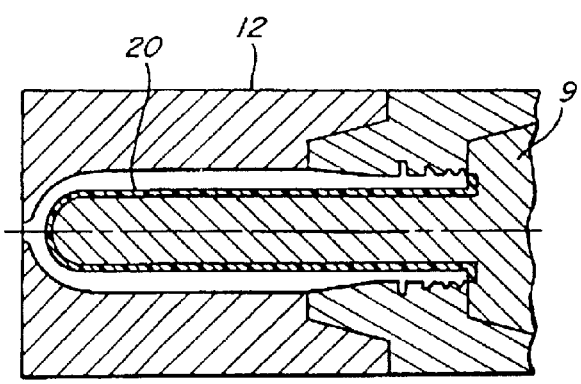
Figure 1D:
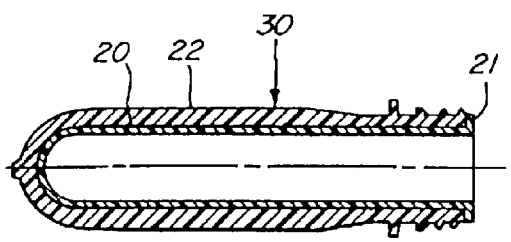

FIGS. 1A–1D illustrate schematically one method embodiment for making a preform with a full-length body sleeve and a single outer layer; this preform is particularly useful for making a returnable and refillable water bottle. FIG. 1A shows a first core 9 positioned in a first mold cavity 11, and forming a chamber therebetween in which there is formed an injection-molded inner sleeve 20. The sleeve 20 is partially cooled and then the core 9 carrying sleeve 20 is removed from the first mold cavity as shown in FIG. 1B. While still warm, the sleeve 20 on core 9 is inserted into a second mold cavity 12 which forms an interior molding chamber for forming an outer layer 22 over the inner sleeve 20. After the second molding step, a preform 30 has been formed including outer layer 22 and inner sleeve 20 as shown in FIG. 1D. The inner sleeve includes a top flange 21 which will form the top sealing surface of the resulting container (see FIG. 4).

The first method embodiment will now be described in greater detail in regard to the apparatus shown in FIGS. 2A–2B, and a time sequence of operations illustrated in the time line of FIG. 3.

Figure 2A:
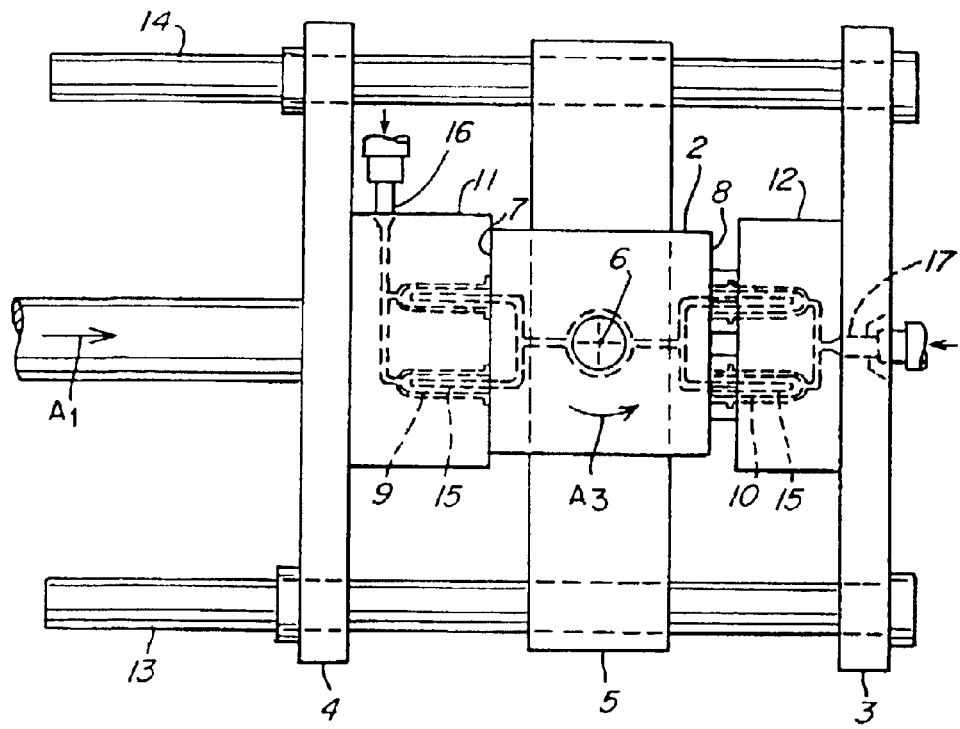
FIGS. 2A–2B are schematic illustrations of an injection-molding apparatus and the sequence of operations for making a preform such as that shown in FIG. 1D, wherein a rotary turret transfers two sets of cores between two sets of cavities.
Figure 2B:
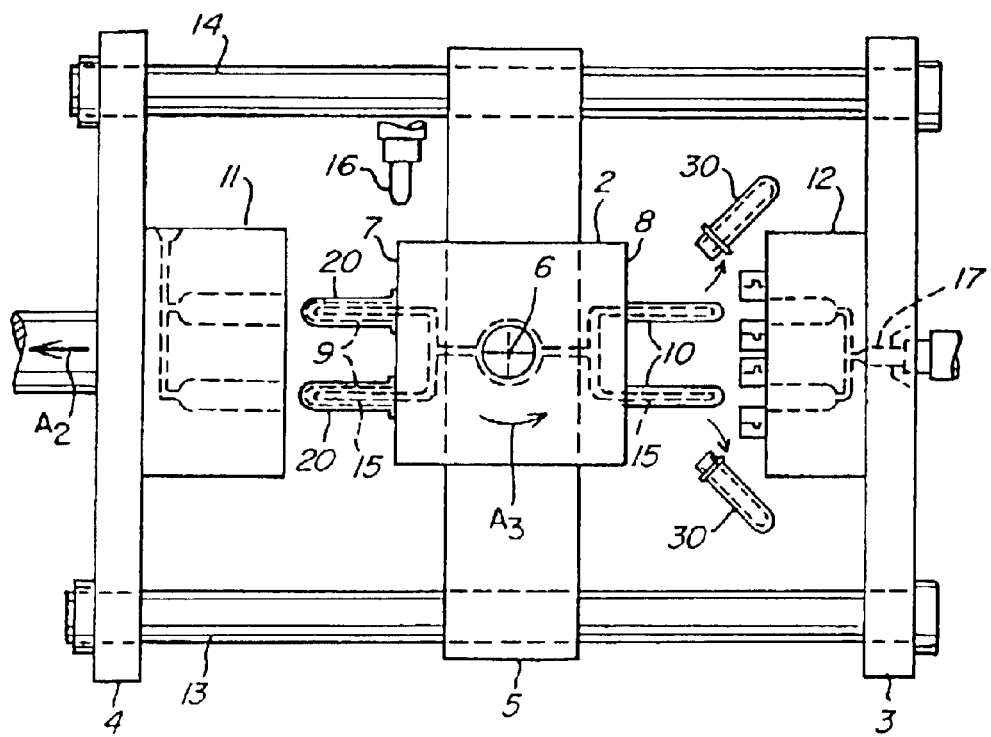

As shown in FIGS. 2A–2B, a four-sided rotatable turret 2 is interposed between a fixed platen 3 and a movable platen 4 on an injection-molding machine. The turret 2 is mounted on a carriage 5 which is slidable in the direction of platen motion (shown by arrows $A_1$ and $A_2$). The turret 2 is rotatable (shown by arrow $A_3$) about an axis 6 disposed perpendicular to the direction of platen motion. The turret is rotatable into two operative positions spaced 180° apart. In each of these positions, the two opposing faces 7, 8 of the turret carrying first and second sets of cores 9, 10 respectively, are received in a first set of cavities 11 on the movable platen 4, and a second set of cavities 12 on the fixed platen 3. After a core set has been successfully positioned in each of the mold cavities, the finished preforms may be ejected from the cores. Each of the mold cavity and core sets include water passages 15 for heating or cooling of the cavities/cores to achieve a desired temperature during molding.

The sequence of operations for forming a particular preform will now be described. The preform has a full-body sleeve of a PEN polymer, such as homopolymer PEN, or a PEN/PET copolymer or blend. The preform has a single outer layer made of virgin PET.

In FIG. 2A, the movable platen 4 carrying the first set of mold cavities 11, and the carriage 5 carrying the turret 2, are each moved on guide bars (tie rods) 13, 14 to the left towards the fixed platen 3 to close the mold (i.e., both cavities). The first set of cores 9 on the left face 7 of the turret are positioned in the first cavity set 11 (first molding station); each first core/cavity pair defines an enclosed chamber for molding an inner sleeve about the first core. The PEN polymer is injected via nozzle 16 into the first mold cavities to form the inner sleeve. Simultaneously, the second core set 10 (on the second face 8 of the turret) is positioned in the second cavity set 12 (second molding station). Virgin PET is injected via nozzle 17 into the second set of cavities to form a single outer layer about a previously-formed inner sleeve on each of the second cores.

Next, the mold is opened as shown in FIG. 2B by moving both the movable platen 4 and carriage 5 to the left, whereby the first cores 9 are removed from the first cavity 11 and the second cores 10 are removed from the second cavity 12. Now, the finished preforms 30 on the second core set are ejected. The finished preforms 30 may be ejected into a set of robot cooling tubes (not shown) as is well known in the art. Next, the turret 2 is rotated 180°, whereby the first set of cores 9 with the inner sleeves 20 thereon are now on the right side of the turret (and ready for insertion into the second set of cavities), while the second set of (empty) cores 10 is now on the left side of the turret (ready for insertion into the first set of mold cavities). Again, the mold is closed as shown in FIG. 2A and injection of the polymer materials into the first and second sets of cavities proceeds as previously described.

In this embodiment, the first and second cores are held at a temperature in a range on the order of 60–70° C., whether they are positioned in the first mold cavities or the second mold cavities. The first mold cavities (for forming the inner sleeve) are held at a temperature on the order of 85–95° C. The melt temperature of the PEN polymer is on the order of 285–295° C. The cycle time in the first mold cavity is on the order of 6–7 seconds, i.e., the time lapse between the first and second injections. This is because, as shown in FIG. 3, the hold and cool stage is substantially eliminated in the first mold cavities. The outer surface temperature of the sleeve (opposite the inner surface engaging the core) at the start of the second injection is 100–110° C.

During the second molding step, the core temperature is again at 60–70° C., but the second mold cavity temperature is 5–10° C. (much lower than the first cavity temperature, to enable quick cooling of the preform). The melt temperature of the virgin PET is on the order of 260 to 275° C.; this is lower than the melt temperature of the PEN polymer, but because the PEN polymer is still warm (at a temperature of 100–110° C.) during the second molding step, there is melt adhesion (including diffusion bonding and chain entanglement) which occurs between the PEN polymer chains and virgin PET polymer chains (inner sleeve and outer layer) respectively. The cycle time for the second molding step is on the order of 35 to 37 seconds.

Figure 3:
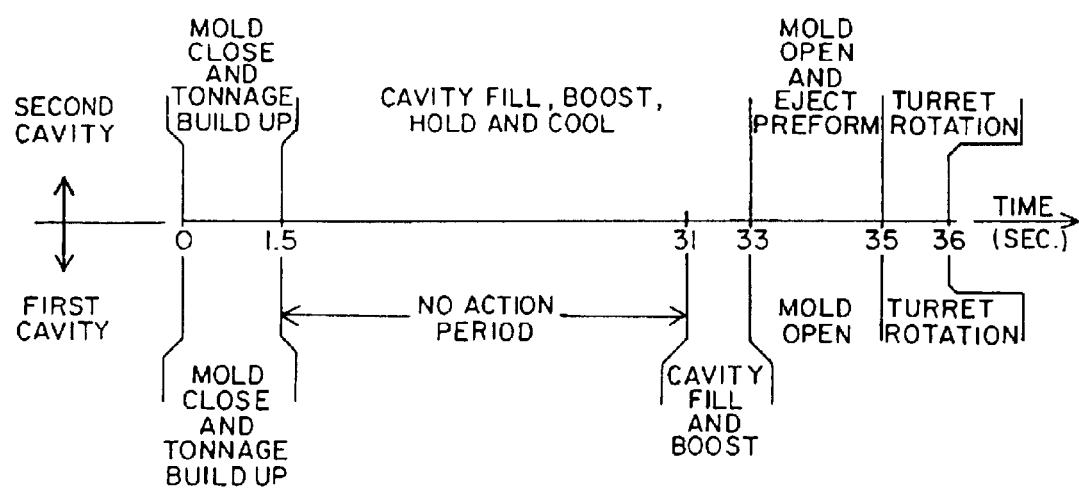
FIG. 3 is a time line showing the sequence of operations for the molding apparatus of FIG. 2.

FIG. 3 is a time line with the cycle time along the x axis (time in seconds), and the sequence of steps in the second cavity set shown above the x axis, and the sequence of steps in the first cavity set shown below the x axis. At t=0, the mold is closed (see FIG. 2A) and the pressure is built up. At t=1.5 seconds, the second cavity (for forming the outer layer) is filled, the pressure boosted, and then the pressure reduced during the hold and cooling stage; this continues until t=33 seconds in the second cavity. Meanwhile, no action is required at t=1.5 seconds in the first cavity ("no action period"); rather, it is not until t=31 seconds that the first cavity is filled and the pressure increased and held, until t=33 seconds. This substantial elimination of the hold and cooling stage (in the first cavity) produces an inner sleeve which is still at an elevated temperature when it is subsequently is positioned in the second cavity, and enables melt adhesion between the outer surface of the inner sleeve and outer layer. At t=33 seconds, the mold is opened (see FIG. 2B), and the preforms from the second cavity are ejected. Then, at t=35 seconds, the turret 2 is rotated so as to position the still-warm sleeves (just made in the first cavity) in a position to be inserted into the second cavity, while the now-empty core set (previously in the second cavity) is now positioned to be inserted in the first cavity. At t=36 seconds, we are ready to begin the next cycle.

The method and apparatus of FIG. 2 may be advantageously used to produce multilayer preforms for a great variety of applications, including refill, hot-fill and pasteurizable containers. A number of alternative embodiments are described below.

The preform made according to the method and apparatus of FIGS. 1–3 includes a full-body inner sleeve 20 of PEN polymer, and a single outer layer 22 of virgin PET. The preform is substantially transparent and amorphous and may be reheated and stretch blow-molded to form a 1.5 liter returnable and refillable water bottle, such as that shown in FIG. 4A. The container 40 is about 13.2 inches (335 mm) in height and about 3.6 inches (92 mm) in widest diameter. The container body has an open top end with a small diameter neck finish 42 having external screw threads for receiving a screw cap (not shown), and a closed bottom end or base 48. Between the neck finish 42 and base 48 is a substantially vertically-disposed sidewall 45 (defined by vertical axis or centerline CL of the bottle), including a substantially cylindrical panel portion 46 and a shoulder portion 44 tapering in diameter from panel 45 to neck finish 42. The base 48 is a champagne-style base with a central gate portion 51 and, moving radially outwardly towards the sidewall, an outwardly concave dome 52, an inwardly concave chime 54, and a radially increasing and arcuate outer base portion 56 for a smooth transition to the sidewall panel 46. The chime 54 is a substantially toroidal-shaped area around a standing ring (chime) on which the bottle rests.

Figures 4A, 4B:
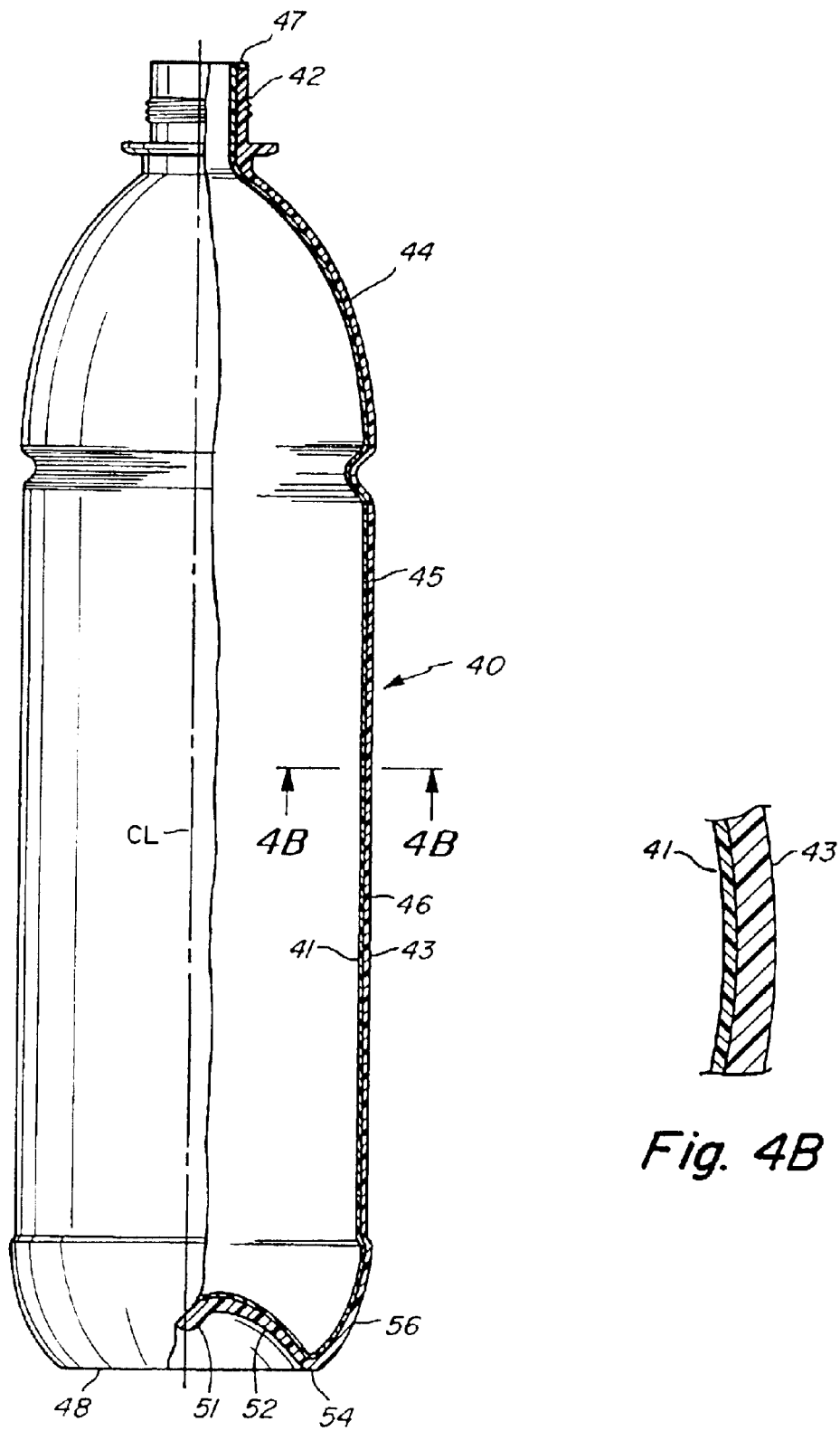
FIG. 4A is a front elevational view of a returnable and refillable container, partially in section, made from the preform of FIG. 1D.
FIG. 4B is an enlarged fragmentary cross-section of the container sidewall taken along the line 4B—4B of FIG. 4A.

FIG. 4B shows in cross-section the multilayer panel portion 46, which includes an inner sleeve layer 41 (an expanded version of preform sleeve 20), and an outer layer 43 (an expanded version of preform outer layer 22). One benefit of the present invention is that the layers 41 and 43 have bonded and will not separate during reheat stretch blow molding or use of the container, in this case including the intended 20 or more refill cycles. In addition, a flange 47 (same as flange 21 of the preform) forms a top sealing surface of the container with increased strength and thermal resistance.

Second Preform Embodiment (Pasteurizable Beer)

Figures 5A, 5B:
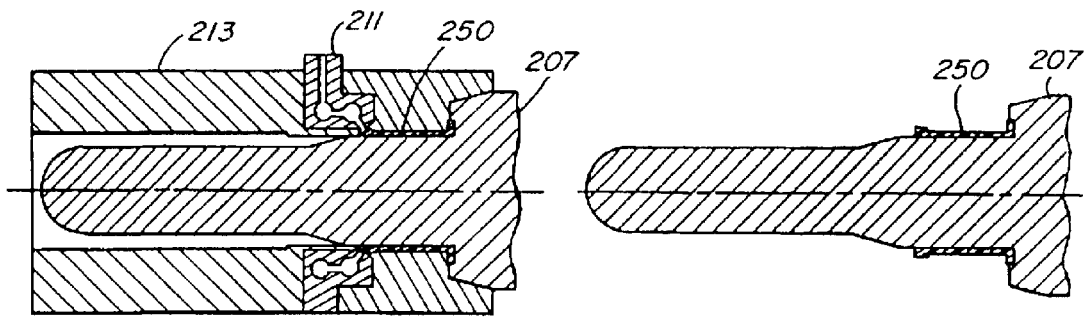
FIGS. 5A–5D are schematic illustrations of a second method embodiment of the present invention for making a preform having a finish only sleeve and a multilayer outer layer.
Figures 5C, 5D:
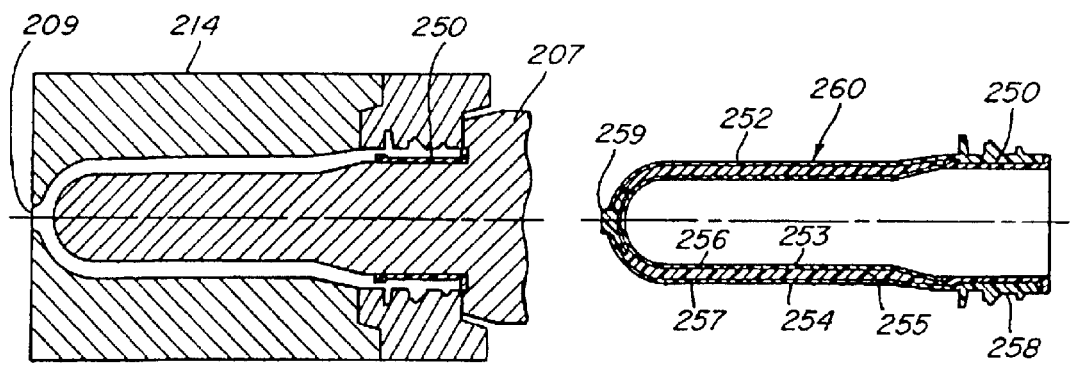

FIGS. 5A–5D illustrate schematically a second method embodiment for making a finish-only sleeve and a multiple outer layer preform; this preform is adapted for making a pasteurizable beer container. FIG. 5A shows a core 207 positioned in a first mold cavity 213; together they form a first molding chamber in which a finish-only sleeve 250 is injection molded. FIG. 5A shows an injection nozzle 211 in the mold cavity 213, through which a molten thermoplastic material is injected for forming the sleeve 250. FIG. 5B shows the formed sleeve 250 on the core 207, the sleeve having been removed from first mold cavity 213 while it is still warm. The core 207 carrying the sleeve 250 is then positioned in a second mold cavity 214 as shown in FIG. 5C. The second mold cavity 214 and core 207 form a second molding chamber adapted to form an outer layer 252 over the inner sleeve 250. A plurality of different thermoplastic materials are injected through a gate 209 in the bottom of the second mold cavity 214, to form the multiple outer layers. As shown in FIG. 5D, the outer layer 252 extends the full length of the preform. A sequential injection process such as that described in U.S. Pat. No. 4,609,516 to Krishnakumar et al., may be used to form inner and outer layers 253, 254 of virgin PET, core layer 255 of recycled PET (which may include an oxygen scavenging material), and inner and outer intermediate layers 256, 257 of an oxygen barrier material, between the inner/core/outer layers. In this embodiment, only the virgin PET extends up into the neck finish of the preform, forming a single layer 258 over inner sleeve 250. In the base of the preform, a final injection of virgin PET forms a plug 259 for clearing the nozzle before the next injection cycle.

Figure 6A:
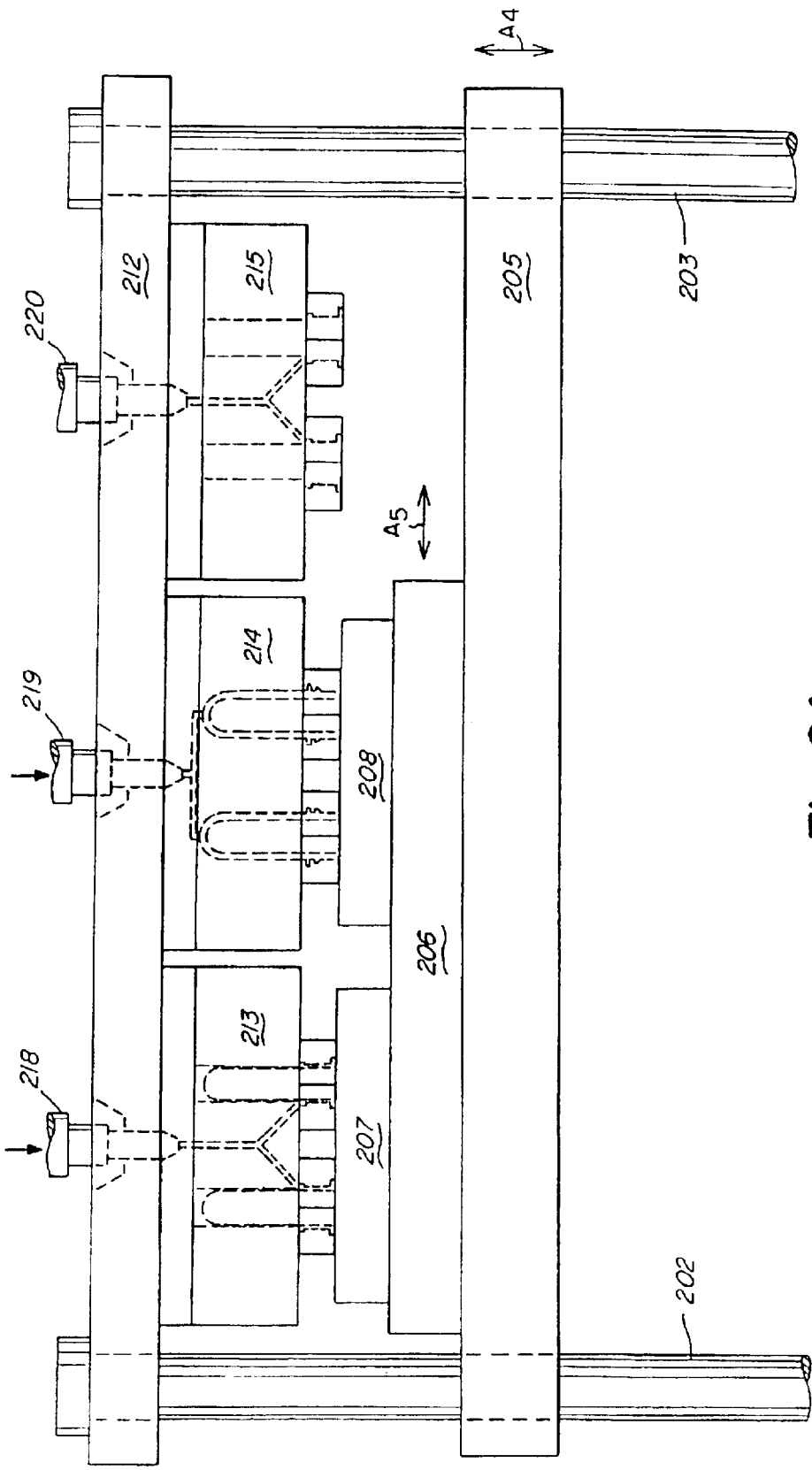
FIGS. 6A–6D are schematic illustrations of an injection-molding apparatus and sequence of operations for making a preform such as that shown in FIG. 5D, wherein the transfer mechanism is a reciprocating shuttle.
Figure 6B:
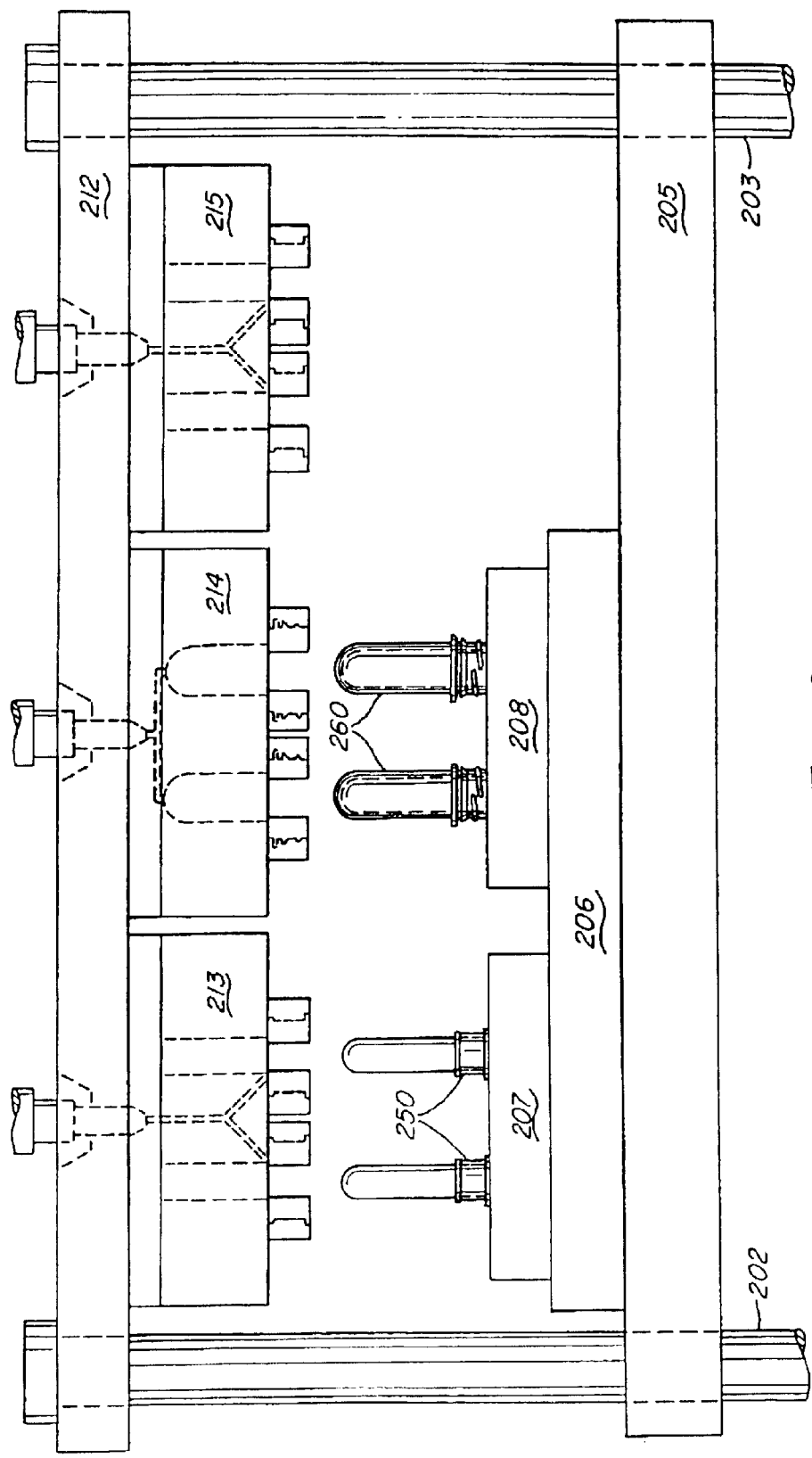
Figure 6C:
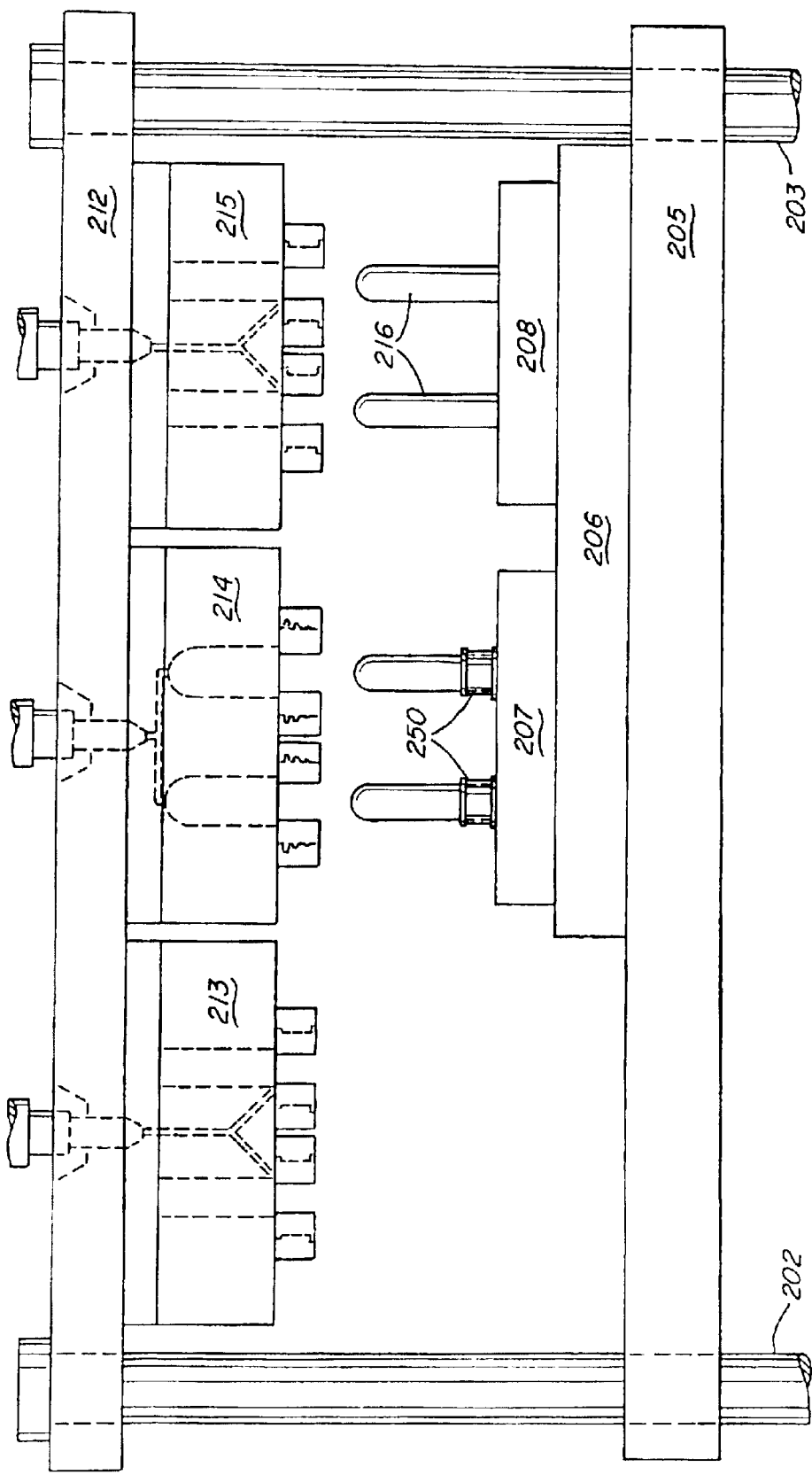
Figure 6D:
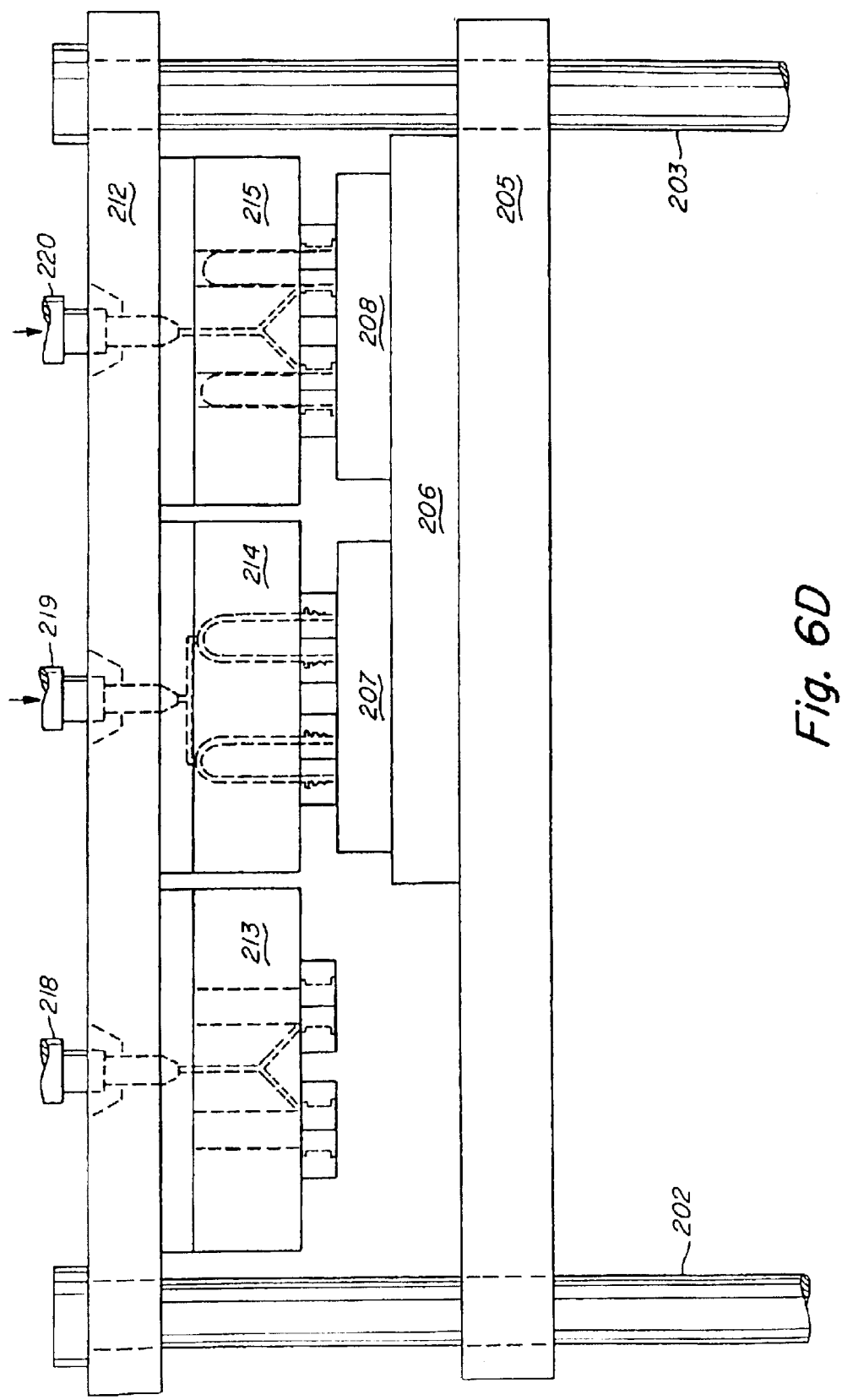
Figure 7:
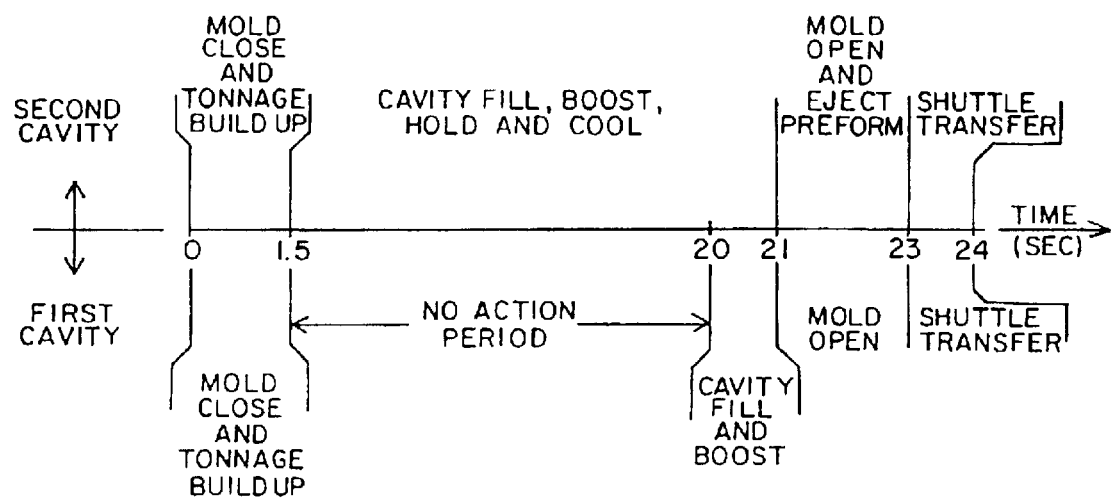
FIG. 7 is a time line of the sequence of operations shown in FIG. 6.

FIGS. 6A–6D illustrate a reciprocating shuttle apparatus, instead of the rotatable turret of FIGS. 2A–2D, which comprises a second apparatus embodiment. This second apparatus will now be described with respect to forming the preform of FIG. 5. FIG. 7 shows a time line of the sequence of operations.

The apparatus (see FIGS. 6A–6D) includes first and second parallel guide bars 202, 203 on which a platen 205 is movably mounted in the direction of arrow $A_4$. The platen 205 carries a platform or shuttle 206 which is movable in a transverse direction across the platen 205 as shown by arrow $A_5$. A fixed platen 212 at one end of the guide bars holds three injection mold cavity sets 213, 214 and 215 which are supplied by nozzles 218, 219 and 220 respectively. The left (first) and right (third) cavity sets 213 and 215 are used to form neck portions of preforms, while the middle (second) cavity set 214 is used for molding body-forming portions.

FIG. 5A shows an arbitrarily-designated first step wherein the first core set 207 is positioned in left cavity set 213 for forming a first set of preform neck portions (sleeves). Simultaneously, second core set 208 is positioned in middle cavity set 214 for molding a set of multilayer body-forming portions (over a second set of previously molded neck portions). FIG. 5B shows the core sets following removal from the cavity sets, with a neck sleeve 250 on each core of core set 207, and a preform 260 on each core of core set 208. The completed preforms 260 are then ejected from the core set 208.

In a second step (FIG. 6C), the shuttle 206 is moved to the right such that the first core set 207 with neck sleeves 250 are now positioned below middle cavity 214, while second core set 208 with now empty cores 216 is positioned below right cavity set 215. Movable platen 205 is then moved towards fixed platen 212 so as to position first core set 207 in middle cavity set 214, and second core set 208 in right cavity set 215 (FIG. 6D). Again, body-forming portions are formed over the previously formed neck sleeves in middle cavity set 214, while neck sleeves are molded on each of the cores in the core set 208 in right cavity set 215. The movable platen 205 is then retracted to remove the core sets from the cavity sets, the finished preforms on the first core set 207 are ejected, and the shuttle 206 returns to the left for molding the next set of layers.

FIG. 7 is a time line of the operations shown in FIG. 6, with time in seconds along the x axis, and the sequence of steps in the second cavity 214 shown above the x axis, and the sequence of steps in the first cavity 213 shown below the x axis. First, at t=0, the mold is closed (FIG. 6A) and the pressure builds up. Then, at t=1.5 seconds, the second cavity 214 is filled (forming the outer layer), the pressure increased, and the pressure held while the preform cools, until t=21 seconds. Meanwhile, no action is required in the first cavity at t=1.5 seconds; at t=20 seconds, the first cavity 213 is filled with PEN polymer and the pressure increased and held until t=21 seconds (again the hold and cooling stage has been substantially eliminated in the first cavity set by delaying the filling stage until near the end of the hold and cooling stage for the second cavity set). At t=21 seconds, the mold is opened and the preforms 260 are ejected from the second cavities. At t=23 seconds, the shuttle 206 with the still warm neck sleeves is transferred to the second shuttle position as shown in FIG. 6C, and at t=24 seconds the mold is closed as shown in FIG. 6D.

In this particular embodiment, the first and second core sets 207, 208 are held at a temperature on the order of 60–70° C. during both of the first and second molding steps. The first mold cavity (for forming the neck finish sleeve) is on the order of 75–85° C. The PEN polymer has a melt temperature on the order of 275–285° C. The cycle time in the first cavity is on the order of 5–6 seconds; this is the time lapse between the first and second injection steps. The surface temperature of the sleeve at the time of the second injection is on the order of 100–110° C.

In the second molding step, the core temperature is on the order of 60–70° C., and the second mold cavity is at a temperature on the order of 5–10° C. The cycle time in the second mold cavity is on the order of 23–25 seconds. The elevated temperature at the outer surface of the sleeve, at the time of the second molding step, causes melt adhesion (including diffusion bonding and chain entanglement) between the PEN polymer of the sleeve and the virgin PET of the outer layer portion 258 which is adjacent the sleeve 250.

Third Preform Embodiment (Hot Fill)

Figure 8A:
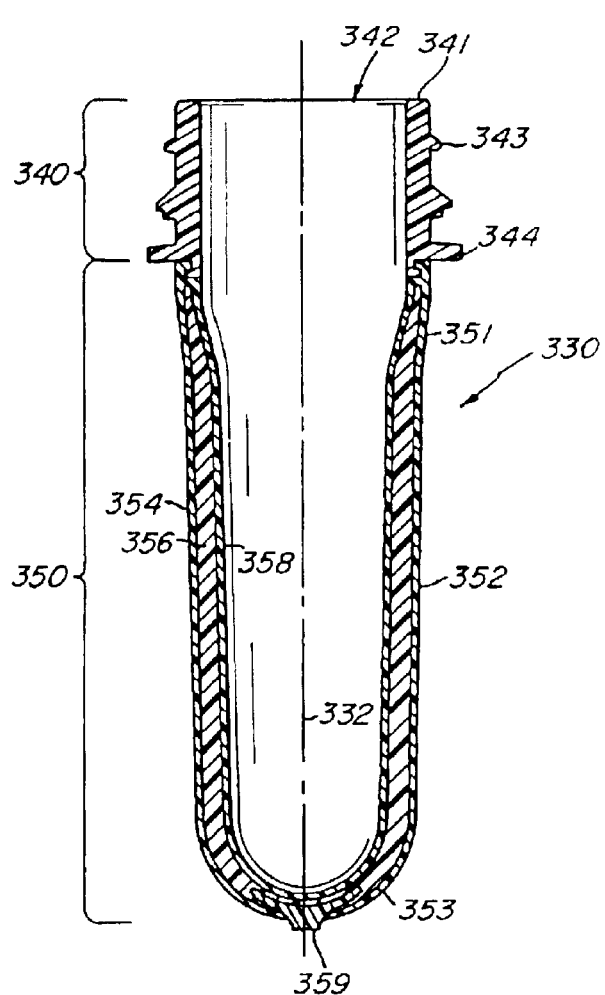
FIG. 8A is a cross-sectional view of a third preform embodiment of the present invention having a full-thickness neck sleeve and multilayer body portion.
Figure 8B:
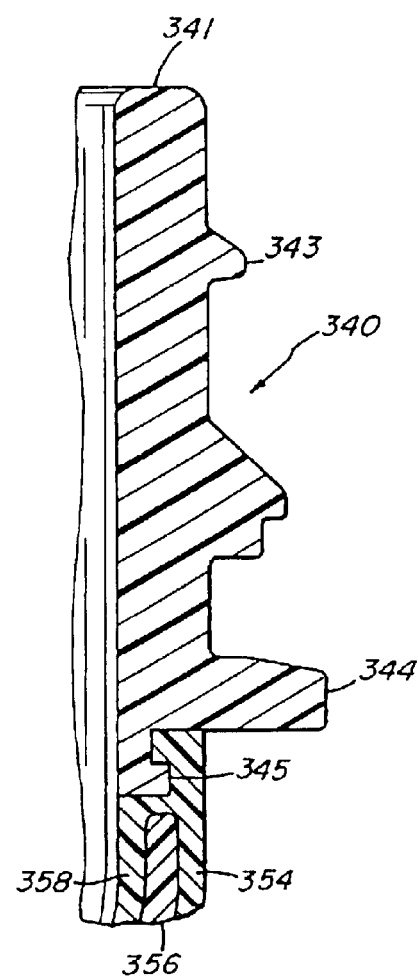
FIG. 8B is an enlarged fragmentary view of the neck finish of the preform of FIG. 8A.
Figure 9A:
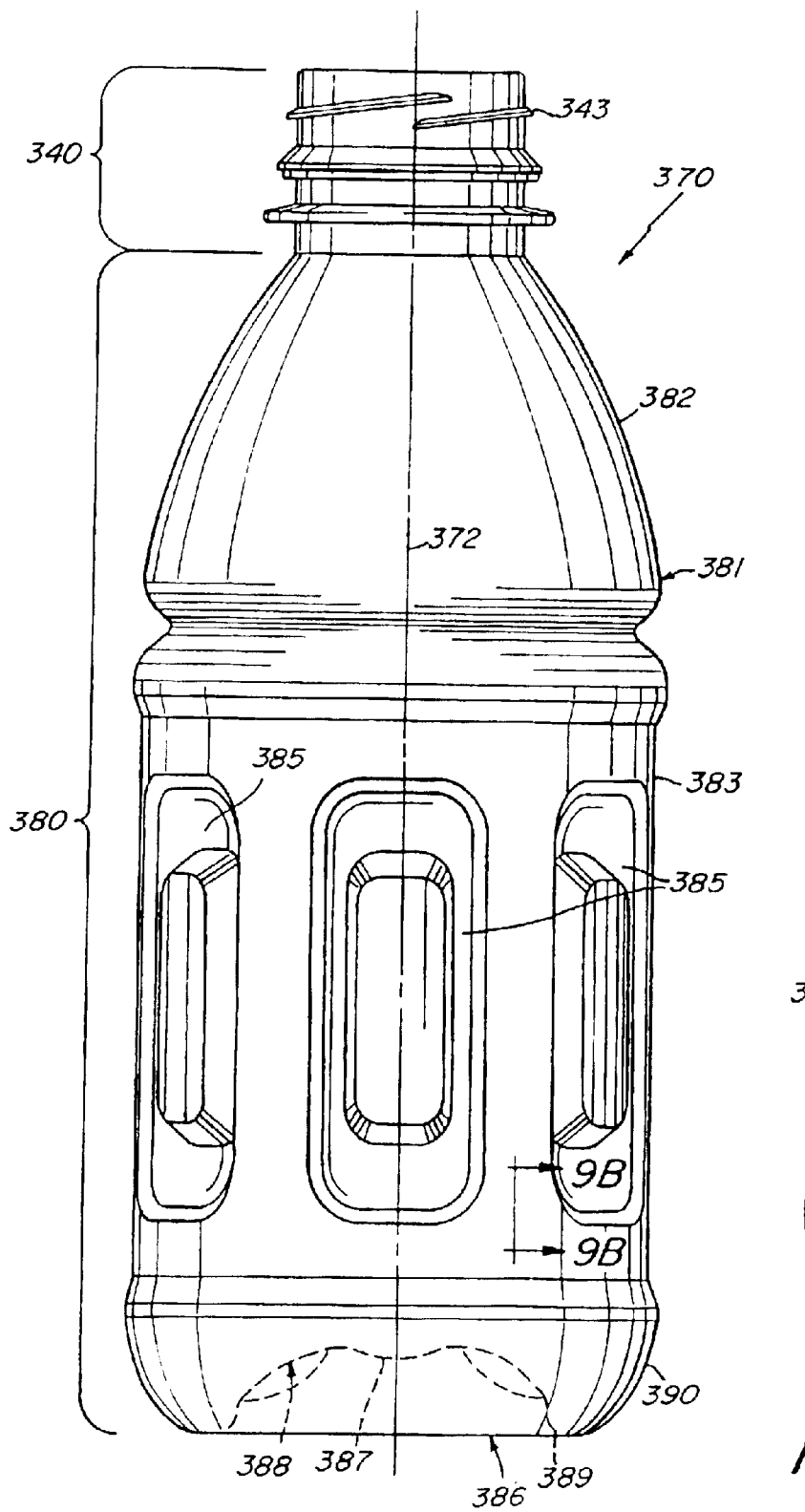
FIG. 9A is a front elevational view of a hot-fill container made from the preform of FIG. 8A.
Figure 9B:
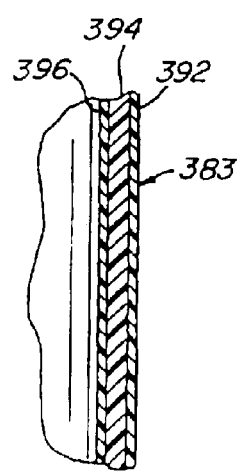
FIG. 9B is a fragmentary cross-section of the container sidewall taken along line 9B—9B of FIG. 9A.

A further preform/container embodiment is illustrated in FIGS. 8–9. FIGS. 8A–8B show a multilayer preform 330 and FIGS. 9A–9B show a hot-fill beverage bottle 370 made from the preform of FIG. 8. In this embodiment, a first molded sleeve forms the entire thickness of the neck finish, and is joined at its lower end to a second molded body-forming portion.

FIG. 8A shows a substantially cylindrical preform 330 (defined by vertical centerline 332) which includes an upper neck portion or finish sleeve 340 bonded to a lower body-forming portion 350. The crystallized neck portion is a monolayer of CPET and includes an upper sealing surface 341 which defines the open top end 342 of the preform, and an exterior surface having threads 343 and a lowermost flange 344. CPET, sold by Eastman Chemical, Kingsport, Tenn., is a polyethylene terephthalate polymer with nucleating agents which cause the polymer to crystallize during the injection molding process. Below the neck finish 340 is a body-forming portion 350 which includes a flared shoulder-forming section 351, increasing (radially inwardly) in wall thickness from top to bottom, a cylindrical panel-forming section 352 having a substantially uniform wall thickness, and a base-forming section 353. Body-forming section 350 is substantially amorphous and is made of the following three layers in serial order: outer layer 354 of virgin PET; core layer 356 of post-consumer PET; and inner layer 358 of virgin PET. The virgin PET is a low copolymer having 3% comonomers (e.g., cyclohexane dimethanol (CHDM) or isophthalic acid (IPA)) by total weight of the copolymer. A last shot of virgin PET (to clean the nozzle) forms a core layer 359 in the base.

This particular preform is designed for making a hot-fill beverage container. In this embodiment, the preform has a height of about 96.3 mm, and an outer diameter in the panel-forming section 352 of about 26.7 mm. The total wall thickness at the panel-forming section 352 is about 4 mm, and the thicknesses of the various layers are: outer layer 354 of about 1 mm, core layer 356 of about 2 mm, and inner layer 358 of about 1 mm. The panel-forming section 352 may be stretched at an average planar stretch ratio of about 10:1, as described hereinafter. The planar stretch ratio is the ratio of the average thickness of the preform panel-forming portion 352 to the average thickness of the container panel 383, wherein the "average" is taken along the length of the respective preform or container portion. For hot-fill beverage bottles of about 0.5 to 2.0 liters in volume and about 0.35 to 0.60 millimeters in panel wall thickness, a preferred planar stretch ratio is about 9 to 12, and more preferably about 10 to 11. The hoop stretch is preferably about 3.3 to 3.8 and the axial stretch about 2.8 to 3.2. This produces a container panel with the desired abuse resistance, and a preform sidewall with the desired visual transparency. The specific panel thickness and stretch ratio selected depend on the dimensions of the bottle, the internal pressure, and the processing characteristics (as determined for example, by the intrinsic viscosity of the particular materials employed).

In order to enhance the crystallinity of the neck portion, a high injection mold temperature is used at the first molding station. In this embodiment, CPET resin at a melt temperature of about 280 to 290° C. is injection molded at a mold cavity temperature of about 110 to 120° C. and a core temperature of about 5 to 15° C., and a cycle time of about 6 to 7 seconds. The first core set, carrying the still warm neck portions (outer surface temperature of about 115 to 125° C.), are then transferred to the second station where multiple second polymers are injected to form the multilayer body-forming portions and melt adhesion occurs between the neck and body-forming portions. The core and/or cavity set at the second station are cooled (e.g., 5 to 15° C. core/cavity temperature) in order to solidify the preforms and enable removal from the molds (cycle time of about 23 to 25 seconds) with acceptable levels of post-mold shrinkage. The cores and cavities at both the first and second stations include water cooling/heating passages for adjusting the temperature as desired.

As used herein, "melt adhesion" between the inner sleeve and outer layer is meant to include various types of bonding which occur due to the enhanced temperature (at the outer surface of the inner sleeve) and pressure (e.g., typical injection molding on the order of 8,000–15,000 psi) during the second molding step, which may include diffusion, chemical, chain entanglement, hydrogen bonding, etc. Generally, diffusion and/or chain entanglement will be present to form a bond which prevents delamination of the layers in the preform, and in the container when filled with water at room temperature (25° C.) and dropped from a height of eighteen inches onto a thick steel plate.

FIG. 8B is an expanded view of the neck finish 340 of preform 330. The monolayer CPET neck finish is formed with a projection 345 at its lower end, which is later surrounded (interlocked) by the virgin PET melt from the inner and outer layers 354,358 at the second molding station. The CPET neck finish and outermost virgin PET layers of the body are melt adhered together in this intermediate region (between the lower end of the neck finish sleeve and the upper end of the body-forming region).

FIG. 9A shows a unitary expanded plastic preform container 370, made from the preform of FIG. 8. The container is about 182.0 mm in height and about 71.4 mm in (widest) diameter. This 16-oz. container is intended for use as a hot-fill non-carbonated juice container. The container has an open top end with the same crystallized neck finish 340 as the preform, with external screw threads 343 for receiving a screw-on cap (not shown). Below the neck finish 340 is a substantially amorphous and transparent expanded body portion 380. The body includes a substantially vertically-disposed sidewall 381 (defined by vertical centerline 372 of the bottle) and base 386. The sidewall includes an upper flared shoulder portion 382 increasing in diameter to a substantially cylindrical panel portion 383. The panel 383 has a plurality of vertically-elongated, symmetrically-disposed vacuum panels 385. The vacuum panels move inwardly to alleviate the vacuum formed during product cooling in the sealed container, and thus prevent permanent, uncontrolled deformation of the container. The base 386 is a champagne-style base having a recessed central gate portion 387 and moving radially outwardly toward the sidewall, an outwardly concave dome 388, an inwardly concave chime 389, and a radially increasing and arcuate outer base portion 390 for a smooth transition to the sidewall 381.

FIG. 9B shows in cross section the multilayer panel portion 383 including an outer layer 392, a core layer 394, and an inner layer 396, corresponding to the outer 354, core 356 and inner 358 layers of the preform. The inner and outer container layers 392, 396 (of virgin PET copolymer) are each about 0.1 mm thick, and the core layer 394 (of post-consumer PET) is about 0.2 mm thick. The shoulder 382 and base 386 are stretched less and therefore are relatively thicker and less oriented than the panel 383.

Fourth Preform Embodiment

Figure 10:
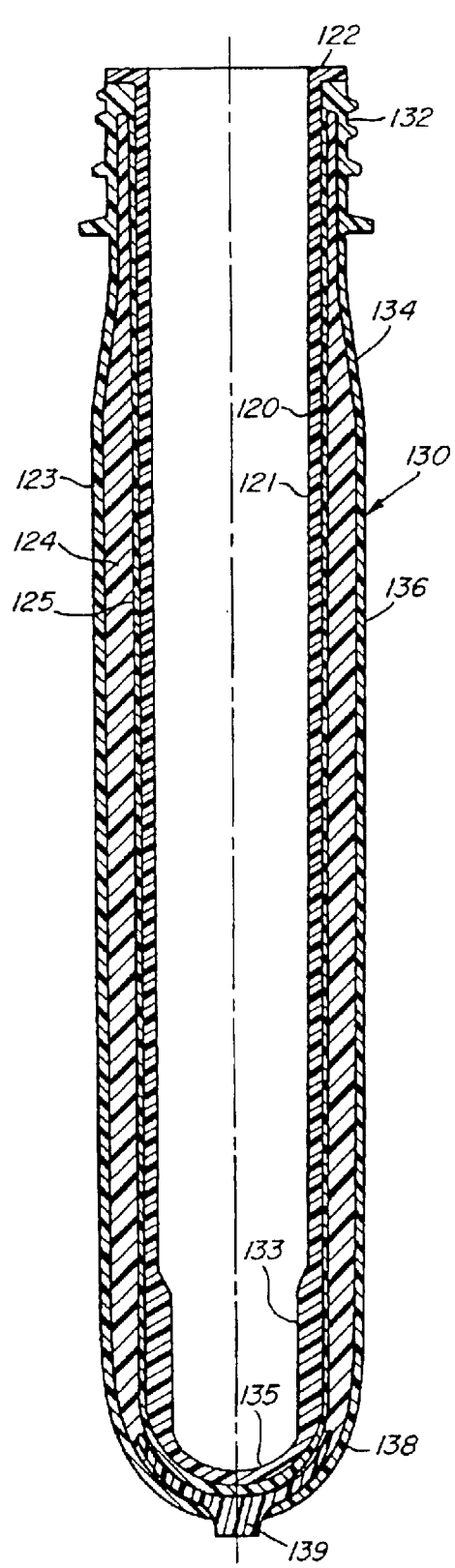
FIG. 10 is a cross-sectional view of a fourth preform embodiment of the present invention, having a full-length body sleeve and multilayer outer layer.

A fourth preform embodiment is illustrated in FIG. 10. A multilayer preform 130 is made from the method and apparatus of FIGS. 1–2, and is adapted to be reheat stretch blow-molded into a refillable carbonated beverage bottle similar to that shown in FIG. 4, but having a thickened base area including the chime for increased resistance to caustic and pressure induced stress cracking.

In FIG. 10 there is shown a preform 130 which includes a PEN inner sleeve layer 120, and a three-layer outer layer comprising outermost (exterior) virgin PET layer 123, first intermediate (interior) PC-PET layer 124, and second intermediate (interior) virgin PET layer 125. The inner sleeve layer 120 is continuous, having a body portion 121 extending the full length of the preform and throughout the base. The sleeve layer further includes an upper flange 122 which forms the top sealing surface of the preform. The outer layer similarly extends the full length and throughout the bottom of the preform.

The preform 130 includes an upper neck finish 132, a flared shoulder-forming section 134 which increases in thickness from top to bottom, a panel-forming section 136 having a uniform wall thickness, and a thickened base-forming section 138. Base section 138 includes an upper cylindrical thickened portion 133 (of greater thickness than the panel section 136) which forms a thickened chime in the container base, and a tapering lower portion 135 of reduced thickness for forming a recessed dome in the container base. A last shot of virgin PET (to clean the nozzle) forms a core layer 139 in the base. A preform having a preferred cross-section for refill applications is described in U.S. Pat. No. 5,066,528 granted Nov. 19, 1991 to Krishnakumar et al., which is hereby incorporated by reference in its entirety.

This particular preform is designed for making a refillable carbonated beverage container. The use of an inner sleeve 120 of a PEN homopolymer, copolymer, or blend provides reduced flavor absorption and increased thermal stability for increasing the wash temperature. The inner PEN sleeve can be made relatively thin according to the method of FIG. 1. The interior PC-PET layer 124 can be made relatively thick to reduce the cost of the container, without significantly affecting performance. In this example, the preform has a height of about 7.130 inches (181.1 mm), and an outer diameter in the panel-forming section 136 of about 1.260 inches (32.0 mm). At the panel-forming section 136, the total wall thickness is about 0.230 inches (5.84 mm), and the thicknesses of the various layers are: inner layer 120 of about 0.040 inches (1.0 mm), outermost layer 123 of about 0.040 inches (1.0 mm), first intermediate layer 124 of about 0.130 inches (3.30 mm), and second intermediate layer 125 of about 0.020 inches (0.5 mm). The panel-forming section 136 may be stretched at an average planar stretch ratio of about 10.5:1, as described hereinafter. The planar stretch ratio is the ratio of the average thickness of the preform panel-forming portion 136 to the average thickness of the container panel (see for example sidewall 46 in FIG. 4), wherein the "average" is taken along the length of the respective preform or container portion. For refillable carbonated beverage bottles of about 0.5 to 2.0 liters in volume and about 0.5 to 0.8 millimeters in panel wall thickness, a preferred planar stretch ratio is about 7.5–10.5, and more preferably about 9.0–10.5. The hoop stretch is preferably about 3.2–3.5 and the axial stretch about 2.3–2.9. This produces a container panel with the desired abuse resistance, and a preform sidewall with the desired visual transparency. The specific panel thickness and stretch ratio selected depend on the dimensions of the bottle, the internal pressure (e.g., 2 atmospheres for beer and 4 atmospheres for soft drinks), and the processing characteristics (as determined for example, by the intrinsic viscosity of the particular materials employed).

In order to provide a thin PEN sleeve layer (e.g. 0.5 to 1.0 mm), a suitable mold cavity temperature would be on the order of 100 to 110° C. and core temperature of about 5 to 15° C., for a PET melt temperature of about 285 to 295° C. and cycle time of about 6 to 7 seconds. The first core set and warm inner layer are then immediately transferred to the second station where the outer layers are injected and bonding occurs between the inner and outer layers (e.g., exterior surface of inner PEN sleeve layer at about 90 to 100° C. and innermost PET layer at about 260 to 275° C.). The first core set and/or second cavity set at the second station are cooled (e.g., about 5 to 15° C.) in order to solidify the perform and enable removal from the mold. The cores and cavities at both the first and second stations include water cooling/heating passages for adjusting the temperature as desired.

In this embodiment, the inner sleeve layer 120 is made from a high-PEN copolymer having 90% PEN/10% PET by total weight of the layer, and in the container panel is about 0.004 inches (0.10 mm) thick. The outermost layer 123 is a virgin PET low copolymer having 3% comonomers (e.g., CHDM or IPA), and in the container panel is about 0.004 in (0.10 mm) thick. The first intermediate layer 124 is PC-PET, and in the container panel is about 0.012 in (0.30 mm) thick. The second intermediate layer 125 is the same virgin PET low copolymer as outermost layer 123, and in the container panel is about 0.002 in (0.05 mm) thick. The container shoulder and base (see 44 and 48 in FIG. 4A) are stretched less and therefore are thicker and less oriented than the panel (see 46 in FIG. 4A).

Fifth Preform Embodiment

Figure 11:
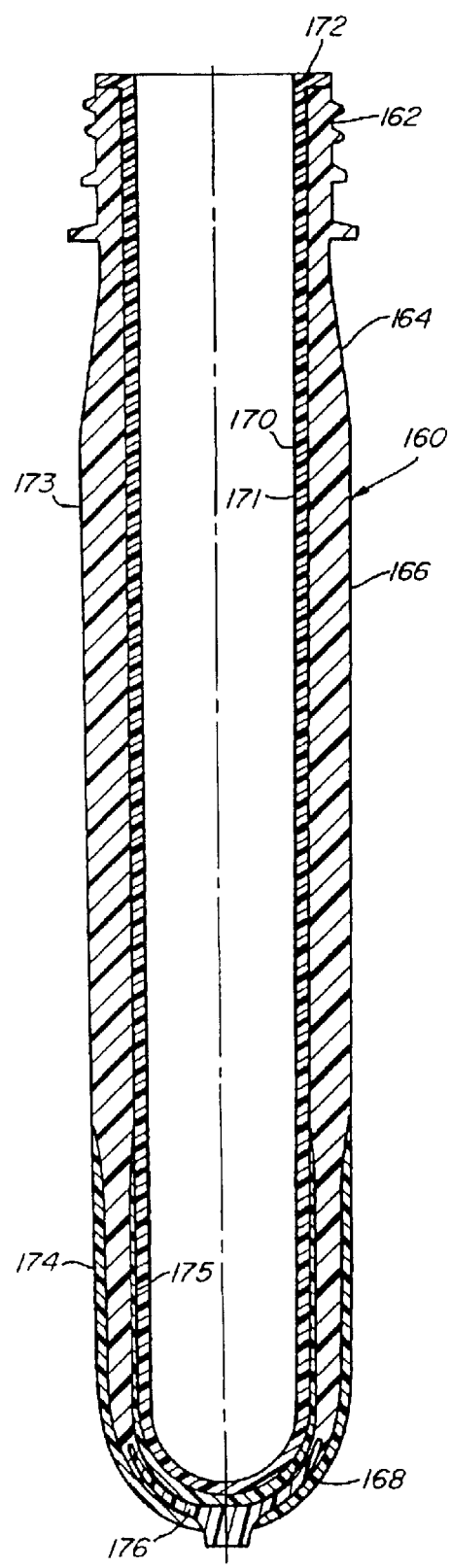
FIG. 11 is a cross-sectional view of a fifth preform embodiment of the present invention, including a full-length body sleeve and an extra outer base layer.

FIG. 11 illustrates another preform embodiment for making a refillable carbonated beverage container. This preform has an additional outermost layer in the base only for increasing caustic stress crack resistance, while maximizing the use of post-consumer PET for reducing the cost. The preform 160 includes an upper neck finish 162, shoulder-forming portion 164, panel-forming section 166, and base-forming portion 168. The inner layer 170 has a body portion 171 which is continuous throughout the length (including the bottom) of the preform and includes an upper flange 172 forming the top sealing surface. The inner layer is virgin PET. An outer layer 173 of PC-PET extends throughout the length of the preform, and forms a single outer layer in the neck finish and panel-forming section. In the base-forming portion an additional exterior layer 174 of high IV virgin PET is provided to enhance the caustic stress crack resistance of the blown container. A thin interior layer 175 of the high IV virgin PET may also be formed according to the sequential injection process previously referenced. A last shot 176 of high IV virgin PET is used to clear out the PC-PET from the nozzle section. The outer base layer 174 is preferably a high IV virgin PET (homopolymer or copolymer) having an intrinsic viscosity of at least about 0.76, and preferably in the range of 0.76 to 0.84. The resulting container may be either a footed or champagne base container.

Sixth Preform Embodiment

Figure 12:
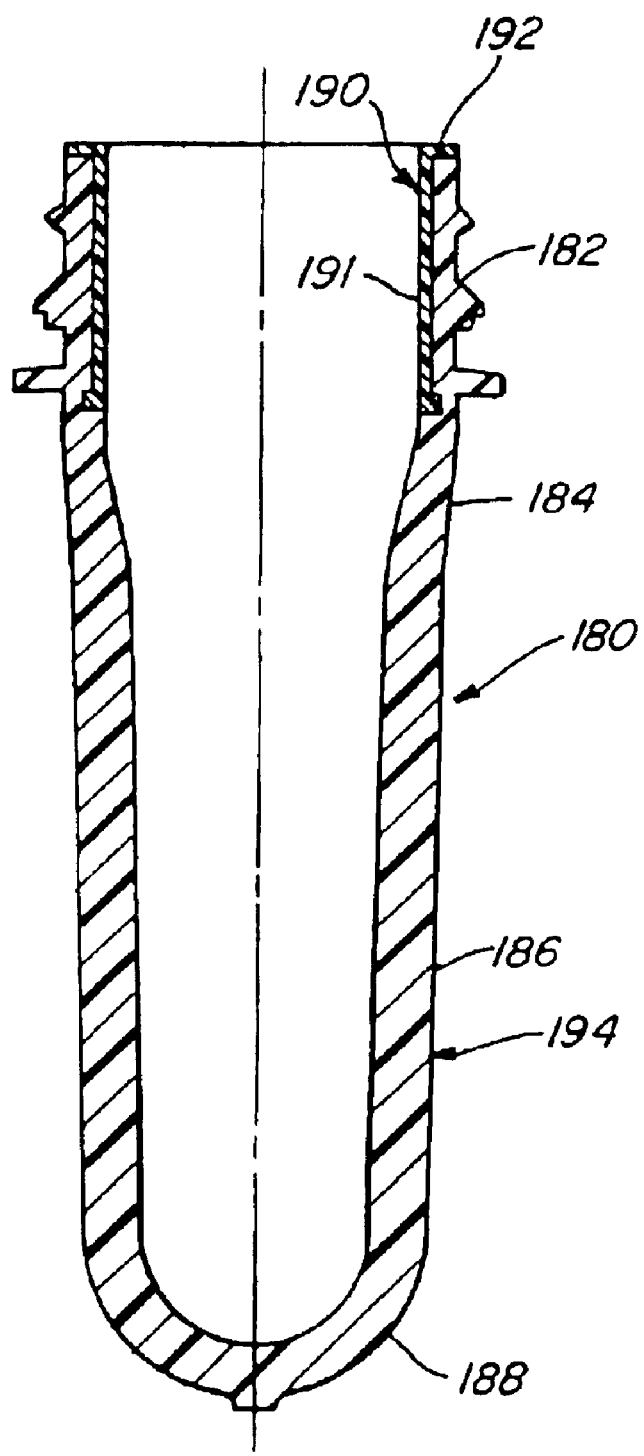
FIG. 12 is a cross-sectional view of a sixth preform embodiment of the present invention, having a finish sleeve and a single layer outer layer.

FIG. 12 shows another preform embodiment including a high-temperature neck finish sleeve 190 and a single outer layer 194 for forming a hot-fill container. The preform 180 includes a neck finish 182, shoulder-forming portion 184, panel-forming portion 186, and base-forming portion 188. The inner sleeve 190 includes a neck finish portion 191, extending substantially along the length of the upper threaded neck finish portion 182 of the container, and an upper flange 192 forming a top sealing surface. The inner sleeve is formed of a thermal resistant (high $T_g$) material such as a PEN homopolymer, copolymer or blend. Alternatively, the sleeve may be formed of CPET, sold by Eastman Chemical, Kingsport, Tenn., a polyethylene terephthalate polymer with nucleating agents which cause the polymer to crystallize during the injection molding process.

The outer layer 194 is made of virgin PET. This preform is intended for making hot-fill containers, wherein the inner sleeve 190 provides additional thermal stability at the neck finish.

In further alternative embodiments, a triple outer layer of virgin PET, PC-PET, and virgin PET may be used.

Alternative Constructions and Materials

There are numerous preform and container constructions, and many different injection moldable materials, which may be adapted for a particular food product and/or package, filling, and manufacturing process. Additional representative examples are given below.

Thermoplastic polymers useful in the present invention include polyesters, polyamides and polycarbonates. Suitable polyesters include homopolymers, copolymers or blends of polyethylene terephthalate (PET), polybutylene terephthalate (PBT), polypropylene terephthalate (PPT), polyethylene napthalate (PEN), and a cyclohexane dimethanol/PET copolymer, known as PETG (available from Eastman Chemical, Kingsport, Tenn.). Suitable polyamides (PA) include PA6, PA6,6, PA6,4, PA6,10, PA11, PA12, etc. Other useful thermoplastic polymers include acrylic/imide, amorphous nylon, polyacrylonitrile (PAN), polystyrene, crystallizable nylon (MXD-6), polyethylene (PE), polypropylene (PP), and polyvinyl chloride (PVC).

Polyesters based on terephthalic or isophthalic acid are commercially available and convenient. The hydroxy compounds are typically ethylene glycol and 1,4-di-(hydroxy methyl)-cyclohexane. The intrinsic viscosity for phthalate polyesters are typically in the range of 0.6 to 1.2, and more particularly 0.7 to 1.0 (for O-chlorolphenol solvent). 0.6 corresponds approximately to a viscosity average molecular weight of 59,000, and 1.2 to a viscosity average molecular weight of 112,000. In general, the phthalate polyester may include polymer linkages, side chains, and end groups not related to the formal precursors of a simple phthalate polyester previously specified. Conveniently, at least 90 mole percent will be terephthalic acid and at least 90 mole percent an aliphatic glycol or glycols, especially ethylene glycol.

Post-consumer PET (PC-PET) is a type of recycled PET prepared from PET plastic containers and other recyclables that are returned by consumers for a recycling operation, and has now been approved by the FDA for use in certain food containers. PC-PET is known to have a certain level of I.V. (intrinsic viscosity), moisture content, and contaminants. For example, typical PC-PET (having a flake size of one-half inch maximum), has an I.V. average of about 0.66 dl/g, a relative humidity of less than 0.25%, and the following levels of contaminants:

PVC: <100 ppm
aluminum: <50 ppm
olefin polymers (HDPE, LDPE, PP): <500 ppm
paper and labels: <250 ppm
colored PET: <2000 ppm
other contaminants: <500 ppm PC-PET may be used alone or in one or more layers for reducing the cost or for other benefits.

Also useful as a base polymer or as a thermal resistant and/or high-oxygen barrier layer is a packaging material with physical properties similar to PET, namely polyethylene naphthalate (PEN). PEN provides a 3–5× improvement in barrier property and enhanced thermal resistance, at some additional expense. Polyethylene naphthalate (PEN) is a polyester produced when dimethyl 2,6-naphthalene dicarboxylate (NDC) is reacted with ethylene glycol. The PEN polymer comprises repeating units of ethylene 2,6 naphthalate. PEN resin is available having an inherent viscosity of 0.67 dl/g and a molecular weight of about 20,000 from Amoco Chemical Company, Chicago, Ill. PEN has a glass transition temperature $T_g$ of about 123° C., and a melting temperature $T_m$ of about 267° C.

Oxygen barrier layers include ethylene/vinyl alcohol (EVOH), PEN, polyvinyl alcohol (PVOH), polyvinyldene chloride (PVDC), nylon 6, crystallizable nylon (MXD-6), LCP (liquid crystal polymer), amorphous nylon, polyacrylonitrile (PAN) and styrene acrylonitrile (SAN).

The intrinsic viscosity (I.V.) effects the processability of the resins. Polyethylene terephthalate having an intrinsic viscosity of about 0.8 is widely used in the carbonated soft drink (CSD) industry. Polyester resins for various applications may range from about 0.55 to about 1.04, and more particularly from about 0.65 to 0.85 dl/g. Intrinsic viscosity measurements of polyester resins are made according to the procedure of ASTM D-2857, by employing 0.0050±0.0002 g/ml of the polymer in a solvent comprising o-chlorophenol (melting point 0° C.), respectively, at 30° C. Intrinsic viscosity (I.V.) is given by the following formula:

$$I.V.=(ln(V_{Soln.}/V_{Sol.}))/C$$

where:

$V_{Soln.}$ is the viscosity of the solution in any units;

$V_{Sol.}$ is the viscosity of the solvent in the same units; and

C is the concentration in grams of polymer per 100 mls of solution.

The blown container body should be substantially transparent. One measure of transparency is the percent haze for transmitted light through the wall ($H_T$) which is given by the following formula:

$$H_T=[Y_d \div (Y_d+Y_s)] \times 100$$

where $Y_d$ is the diffuse light transmitted by the specimen, and $Y_s$ is the specular light transmitted by the specimen. The diffuse and specular light transmission values are measured in accordance with ASTM Method D 1003, using any standard color difference meter such as model D25D3P manufactured by Hunterlab, Inc. The container body should have a percent haze (through the panel wall) of less than about 10%, and more preferably less than about 5%.

The preform body-forming portion should also be substantially amorphous and transparent, having a percent haze across the wall of no more than about 10%, and more preferably no more than about 5%.

The container will have varying levels of crystallinity at various positions along the height of the bottle from the neck finish to the base. The percent crystallinity may be determined according to ASTM 1505 as follows:

$$\% \text{ crystallinity}=[(ds-da)/(dc-da)] \times 100$$

where ds=sample density in g/cm$^3$, da=density of an amorphous film of zero percent crystallinity, and dc=density of the crystal calculated from unit cell parameters. The panel portion of the container is stretched the greatest and preferably has an average percent crystallinity in at least the outer layer of at least about 15%, and more preferably at least about 20%. For primarily PET polymers, a 15–25% crystallinity range is useful in refill and hot-fill applications.

Further increases in crystallinity can be achieved by heat setting to provide a combination of strain-induced and thermal-induced crystallization. Thermal-induced crystallinity is achieved at low temperatures to preserve transparency, e.g., holding the container in contact with a low temperature blow mold. In some applications, a high level of crystallinity at the surface of the sidewall alone is sufficient.

As a further alternative embodiment, the preform may include one or more layers of an oxygen scavenging material. Suitable oxygen scavenging materials are described in U.S. Ser. No. 08/355,703 filed Dec. 14, 1994 by Collette et al., entitled "Oxygen Scavenging Composition For Multilayer Preform And Container," which is hereby incorporated by reference in its entirety. As disclosed therein, the oxygen scavenger may be a metal-catalyzed oxidizable organic polymer, such as a polyamide, or an anti-oxidant such as phosphite or phenolic. The oxygen scavenger may be mixed with PC-PET to accelerate activation of the scavenger. The oxygen scavenger may be advantageously combined with other thermoplastic polymers to provide the desired injection molding and stretch blow molding characteristics for making substantially amorphous injection molded preforms and substantially transparent biaxially oriented polyester containers. The oxygen scavenger may be provided as an interior layer to retard migration of the oxygen scavenger or its byproducts, and to prevent premature activation of the scavenger.

Refillable containers must fulfill several key performance criteria in order to achieve commercial viability, including:

1. high clarity (transparency) to permit visual on-line inspection;
2. dimensional stability over the life of the container; and
3. resistance to caustic wash induced stress cracking and leakage.

Generally, a refillable plastic bottle must maintain its functional and aesthetic characteristics over a minimum of 10 and preferably 20 cycles or loops to be economically feasible. A cycle is generally comprised of (1) an empty hot caustic wash, (2) contaminant inspection (before and/or after wash) and product filling/capping, (3) warehouse storage, (4) distribution to wholesale and retail locations and (5) purchase, use and empty storage by the consumer, followed by eventual return to the bottler.

A test procedure for simulating such a cycle would be as follows. As used in this specification and claims, the ability to withstand a designated number of refill cycles without crack failure and/or with a maximum volume change is determined according to the following test procedure.

Each container is subjected to a typical commercial caustic wash solution prepared with 3.5% sodium hydroxide by weight and tap water. The wash solution is maintained at a designated wash temperature, e.g., 60° C. The bottles are submerged uncapped in the wash for 15 minutes to simulate the time/temperature conditions of a commercial bottle wash system. After removal from the wash solution, the bottles are rinsed in tap water and then filled with a carbonated water solution at 4.0±0.2 atmospheres (to simulate the pressure in a carbonated soft drink container), capped and placed in a 38° C. convection oven at 50% relative humidity for 24 hours. This elevated oven temperature is selected to simulate longer commercial storage periods at lower ambient temperatures. Upon removal from the oven, the containers are emptied and again subjected to the same refill cycle, until failure.

A failure is defined as any crack propagating through the bottle wall which results in leakage and pressure loss. Volume change is determined by comparing the volume of liquid the container will hold at room temperature, both before and after each refill cycle.

A refillable container can preferably withstand at least 20 refill cycles at a wash temperature of 60° C. without failure, and with no more than 1.5% volume change after 20 cycles.

In this invention, a higher level of crystallization can be achieved in the neck finish compared to prior art processes which crystallize outside the mold. Thus, the preform neck finish may have a level of crystallinity of at least about 30%. As a further example, a neck finish made of a PET homopolymer can be molded with an average percent crystallinity of at least about 35%, and more preferably at least about 40% To facilitate bonding between the neck portion and body-forming portion of the preform, one may use a thread split cavity, wherein the thread section of the mold is at a temperature above 60° C., and preferably above 75° C.

As an additional benefit, a colored neck finish can be produced, while maintaining a transparent container body.

The neck portion can be monolayer or multilayer and made of various polymers other than CPET, such as arylate polymers, polyethylene naphthalate (PEN), polycarbonates, polypropylene, polyimides, polysulfones, acrylonitrile styrene, etc. As a further alternative, the neck portion can be made of a regular bottle-grade homopolymer or low copolymer PET (i.e., having a low crystallization rate), but the temperature or other conditions of the first molding station can be adjusted to crystallize the neck portion.

Other benefits include the achievement of higher hot-fill temperatures (i.e., above 85° C.) because of the increased thermal resistance of the finish, and higher refill wash temperatures (i.e., above 60° C.). The increased thermal resistance is also particularly useful in pasteurizable containers.

Figure 13A:
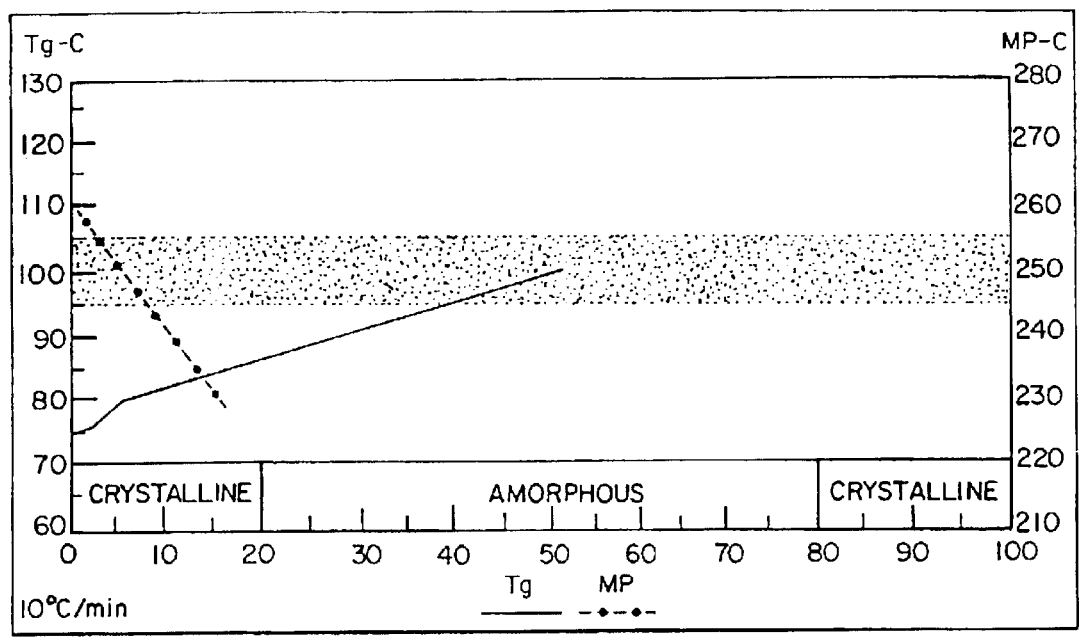
FIGS. 13A and 13B are graphs showing the change in melting temperature (MP) and orientation temperature ($T_g$) for various PEN/PET compositions.
Figure 13B:
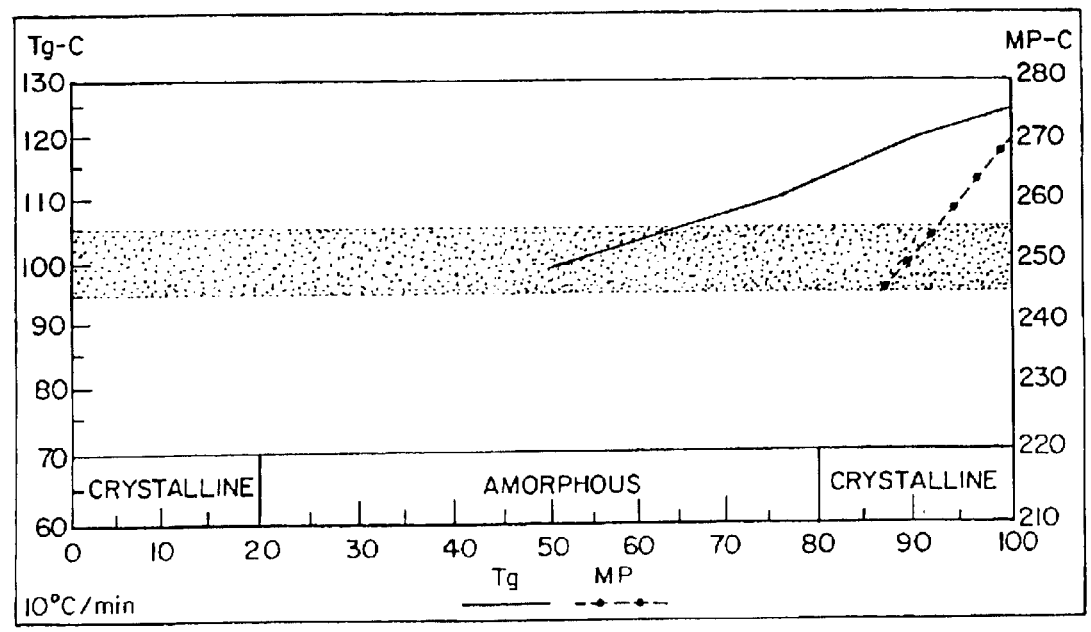

FIGS. 13A–13B illustrate graphically the change in melt temperature and orientation temperature for PET/PEN compositions, as the weight percent of PEN increases from 0 to 100. There are three classes of PET/PEN copolymers or blends: (a) a high-PEN concentration having on the order of 80–100% PEN and 0–20% PET by total weight of the copolymer or blend, which is a strain-hardenable (orientable) and crystallizable material; (b) a mid-PEN concentration having on the order of 20–80% PEN and 80–20% PET, which is an amorphous non-crystallizable material that will not undergo strain hardening; and (c) a low-PEN concentration having on the order of 1–20% PEN and 80–99% PET, which is a crystallizable and strain-hardenable material. A particular PEN/PET polymer or blend can be selected from FIGS. 13A–13B based on the particular application.

Figure 14:
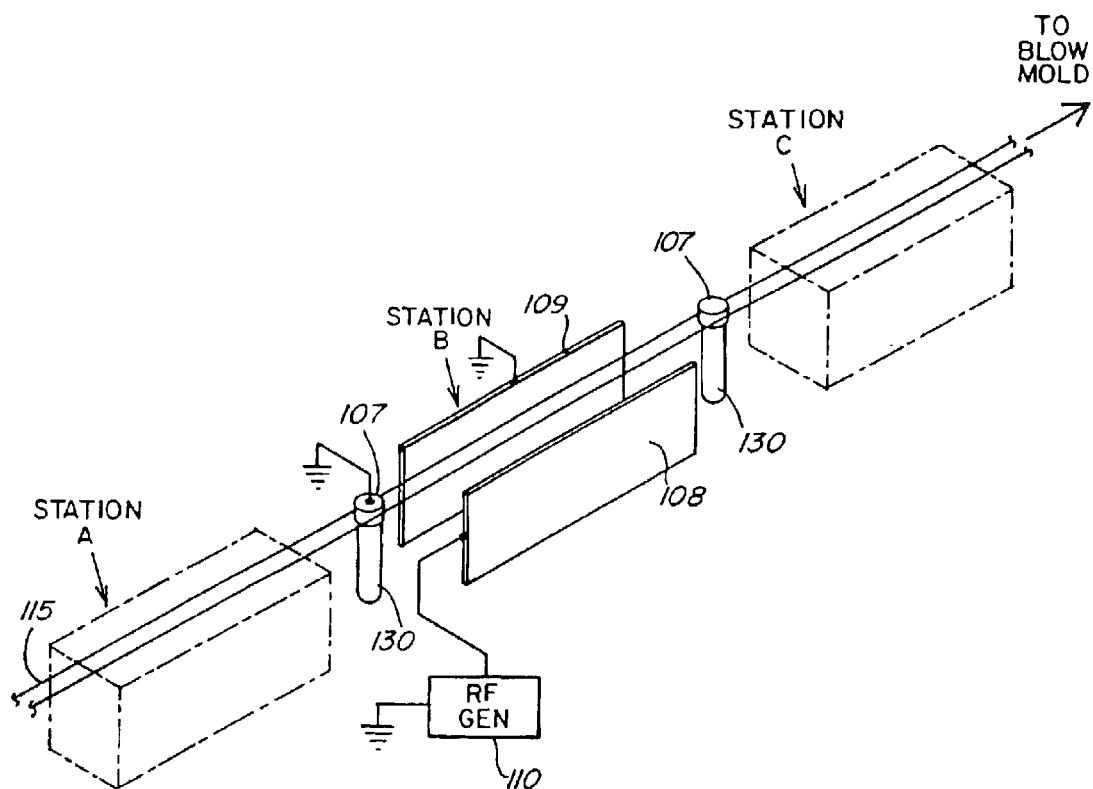
FIG. 14 is a schematic illustration of a three-station reheating apparatus, including IR heating stations A and C and RF heating station B.

FIG. 14 illustrates a particular embodiment of a combined infrared (IR) and radio frequency (RF) heating system for reheating previously molded and cooled preforms (i.e., for use in a two-stage reheat injection mold and stretch blow process). This system is intended for reheating preforms having layers with substantially different orientation temperatures. For example, in the fourth preform embodiment the high-PEN inner layer 120 has an orientation temperature much higher than the virgin PET low copolymer and PC-PET outer layers 123–125. PEN homopolymer has a minimum orientation temperature on the order of 260° F. (127° C.), based on a glass transition temperature on the order of 255° F. (123° C.). PEN homopolymer has a preferred orientation range of about 270–295° F. (132–146° C.). In contrast, PET homopolymer has a glass transition temperature on the order of 175° F. (80° C.). At the minimum orientation temperature of PEN homopolymer, PET homopolymer would begin to crystallize and would no longer undergo strain hardening (orientation), and the resulting container would be opaque and have insufficient strength.

Returning to FIG. 14, this combined reheating apparatus may be used with preforms having a substantial disparity in orientation temperatures between layers. The preforms 130 are held at the upper neck finish by a collet 107 and travel along an endless chain 115 through stations A, B and C in serial order. Station A is a radiant heating oven in which the preforms are rotated while passing by a series of quartz heaters. The heating of each preform is primarily from the exterior surface and heat is transmitted across the wall to the inner layer. The resulting heat or temperature profile is higher at the exterior surface of the preform than at the interior surface. The time and temperature may be adjusted in an attempt to equilibriate the temperature across the wall.

In this embodiment, it is desired to heat the inner PEN layer at a higher temperature because of PEN's higher orientation temperature. Thus, the preforms (across the wall) are brought up to an initial temperature of about 160° F. (71° C.) at station A, and are then transferred to station B which utilizes microwave or radio frequency heaters. These high-frequency dielectric heaters provide a reverse temperature profile from that of the quartz heaters, with the interior surface of the preform being heated to a higher temperature than that of the exterior surface. FIG. 14 shows the preforms 130 traveling between electrode plates 108 and 109, which are connected to RF generator 110 and ground respectively. At station B, the inner layer is brought up to a temperature of about 295° F. (146° C.), and the outer layer to a temperature of about 200° F. (93° C.). Finally, the preforms are passed to station C, which is similar to station A. At station C the quartz heaters bring the preforms to a temperature of about 280° F. (138° C.) at the inner layer and about 210° F. (99° C.) at the outer layer. The reheated preforms are then sent to a blow mold for stretch blow molding. A more detailed description of hybrid reheating of polyester preforms including a combination of quartz oven reheating and radio frequency reheating is described in U.S. Pat. No. 4,731,513 to Collette entitled "Method Of Reheating Preforms For Forming Blow Molded Hot Fillable Containers," which issued Mar. 15, 1988, and is hereby incorporated by reference. In addition, additives may be provided in either or both of the PET and PEN layers to make them more receptive to radio frequency heating.

In a preferred thin sleeve/thick outer layer embodiment, the thin inner layer sleeve may have a thickness on the order of 0.02 to 0.06 inch (0.5 to 1.5 mm), while the thick outer layer has a wall thickness on the order of 0.10 to 0.25 inch (2.50 to 6.35 mm). The inner layer may comprise on the order of 10–20% by total weight of the preform. This represents an improvement over the prior art single injection cavity process for making multilayer preforms. Also, the weight of one or more outer layers (such as a layer of PC-PET) can be maximized.

While there have been shown and described several embodiments of the present invention, it will be obvious to those skilled in the art that various changes and modifications may be made therein without departing from the scope of the invention as defined by the appending claims.

What is claimed is:

1. A method of making a multilayer injection-molded plastic article, the method comprising:
   firstly molding an inner sleeve layer between a first mold cavity and core, the first mold cavity being heated in order to provide an outer surface of the inner sleeve layer at an elevated temperature in a subsequent molding step;
   transferring the core and sleeve layer to a second mold cavity and secondly molding an outer layer over the sleeve layer while the outer surface is at the elevated temperature, the outer layer having a thickness greater than the thickness of the inner sleeve layer, where the elevated temperature is selected to provide melt adhesion between the inner sleeve and the outer layer during the second molding step.

2. The method of claim 1, wherein:
   the inner sleeve comprises a nonrecycled polymer; and
   the outer layer comprises a recycled polymer.

3. The method of claim 2, wherein:
   the nonrecycled polymer is a virgin polyethylene terephthalate (PET) polymer including homopolymer, low copolymer and blends of PET; and
   the recycled polymer is recycled PET.

4. The method of claim 3, wherein:
   the inner sleeve comprises up to 20% by weight of the article.

5. The method of claim 4, wherein:
the inner sleeve comprises on the order of 10% by weight of the article.

6. The method of claim 3, wherein:
the inner sleeve is a full-length Inner sleeve of nonrecycled PET comprising up to 20% by weight of the article;
the outer layer includes at least one layer of recycled PET.

7. The method of claim 1, wherein the inner sleeve is selected from the group consisting of:
a full-length sleeve portion;
an upper sleeve portion;
a full-thickness upper sleeve portion; and
a sleeve portion including an upper surface of the article;
and the inner sleeve comprises a polymer selected from the group consisting of:
a high $T_g$ polymer;
a polyethylene naphthalate (PEN) polymer including homopolymer, low copolymer and blends of PEN; and
a crystallizable polymer.

8. The method of claim 1, wherein:
the article is a preform for making a beverage container.

9. The method of claim 8, wherein:
the article is expanded to make a beverage container selected from the group consisting of carbonated beverage, hot-fillable, refillable, pasteurizable, and oxygen-barrier containers.

10. The method of claim 1, wherein the melt adhesion between the inner sleeve and outer layer includes one or more of diffusion bonding and chain entanglement.

11. The method of claim 1, wherein the sleeve forms an upper sleeve portion of the article, and the outer layer forms a lower body portion of the article.

12. The method of claim 11, wherein the upper sleeve portion is crystallized in the first mold cavity.

13. The method of claim 1, wherein the first molding step forms the inner sleeve as:
a full-length sleeve portion;
an upper sleeve portion;
a full-thickness upper sleeve portion; and
a sleeve portion including an upper surface of the article.

14. The method of claim 1, wherein the outer layer comprises multiple outer layers.

15. The method of claim 1, wherein the article is a preform.

16. The method of claim 15, wherein the first molding step forms a neck finish portion of the preform.

17. The method of claim 16, wherein the neck finish portion is molded from a polymer which crystallizes during the first molding step.

18. The method of claim 16, wherein the neck finish portion is molded from a first polymer material having a higher glass transition temperature than a second polymer material which forms the outer layer.

19. The method of claim 1, wherein the sleeve is crystallized during the first molding step.

20. The method of claim 1, wherein the sleeve has a wall thickness in a range on the order of 0.5 to 1.5 mm.

21. The method of claim 20, wherein the outer layer has a wall thickness in a range on the order of 2.50 to 6.35 mm.

22. The method of claim 1, wherein the inner sleeve is formed of a first material having a first melt temperature, and the outer layer includes a second layer adjacent the inner sleeve and made of a second material having a second melt temperature lower than the first melt temperature.

23. The method of claim 22, wherein:
the inner sleeve comprises a first polyethylene terephthalate (PET) polymer; and
the outer layer comprises a second PET polymer.

24. The method of claim 23, wherein:
each of the first and second PET polymers are selected from the group consisting of PET homopolymer and low copolymers.

25. The method of claim 24, wherein:
the first PET polymer has an intrinsic viscosity of at least 0.76.

26. The method of claim 25, wherein:
the inner sleeve has a wall thickness in a range of 0.5 to 1.5 mm; and
the outer layer has a wall thickness in range of 2.50 to 6.35 mm.

27. The method of claim 23, wherein:
the article is a preform for making a beverage container.

28. The method of claim 27, wherein:
the preform has a body portion and the method further comprises expanding the body portion of the preform to form a container having a substantially transparent and biaxially-oriented body portion.

29. The method of claim 1, wherein the first mold cavity is at a first cavity temperature and the second mold cavity is at a second cavity temperature lower than the first cavity temperature.

30. The method of claim 29, wherein the core is at a core temperature which is less than the first cavity temperature.

31. The method of claim 1, wherein the inner sleeve is formed of a first material having a first $T_g$, and the elevated temperature is in a range on the order of 5–20° below the first $T_g$.

32. The method of claim 1, wherein the sleeve is molded from a first material selected from the group consisting of homopolymers, copolymers, and blends of polyethylene naphthalate (PEN).

33. The method of claim 1, wherein the outer layer includes at least one layer molded from a second material selected from the group consisting of polyethylene terephthalate (PET), recycled PET, polyethylene, polypropylene, polyacrylate, polycarbonate, polyacrylonitrile, nylon, and copolymers and blends thereof.

34. The method of claim 1, wherein the article has a sidewall portion in which the Inner sleeve has a first thickness ($t_1$) and the outer layer has a second thickness ($t_2$), and the ratio of $t_2:t_1$ is greater than on the order of 4:1.

35. The method of claim 1, wherein the inner sleeve has a first thickness ($t_1$) and the outer layer has a second thickness ($t_2$), and the ratio of $t_2:t_1$ is on the order of from 1.2:1 to 8:1.

36. The method of claim 1, wherein the inner sleeve is substantially crystallized and the outer layer is substantially amorphous.

37. The method of claim 1, wherein the inner sleeve is made of a first material and the outer layer is made of a second material, and the second material has a lower crystallization rate compared to the first material.

38. The method of claim 1, wherein first and second cores are provided, and wherein during a first cycle the first core is positioned in the first mold cavity to form a first inner sleeve, and the second core, having a second inner sleeve positioned thereon, is simultaneously positioned in the second mold cavity for molding a second outer layer on the second inner sleeve.

39. The method of claim 1, wherein the first molding step includes an initial no-action period during which the second molding step proceeds in order to facilitate the second molding step with the outer surface of the sleeve layer at the elevated temperature.

40. The method of claim 1, wherein the sleeve is molded of a first material selected from the group consisting of polyester, polyester with nucleating agents, acrylate, polyethylene naphthalate (PEN), polycarbonate, polypropylene, polyamide, polysulfone, acrylonitrile styrene, and copolymers and blends thereof.

41. The method of claim 40, wherein the outer layer includes a second material selected from the group consisting of homopolymers, copolymers, and blends of any one or more of: polyethylene terephthalate (PET), polyethylene naphthalate (PEN), and recycled PET.

42. The method of claim 1, wherein the article has a body portion and the method further comprises expanding the body portion of the article to form an expanded article having a substantially transparent and biaxially-oriented body portion.

43. The method of claim 1, wherein the method further comprises cooling the article below a first glass transition temperature of a first material comprising the inner sleeve layer, reheating the article above the first glass transition temperature, and expanding the reheated article to form an expanded article.

44. The method of claim 1, wherein the expanded article has a high $T_g$ or crystallized upper neck finish portion and a substantially transparent, biaxially-oriented body portion.

45. A method of molding a multilayer plastic article in which a first layer is molded over a core in a first mold cavity and the first layer and core are transferred to a second mold cavity where a second layer is molded, wherein:
    there is substantially eliminated any cooling stage in the first mold in order to provide an outer surface of the first layer at an elevated temperature in the second mold which enables melt adhesion between the outer surface of the first layer and the second layer.

46. The method of claim 45, wherein there is provided an initial no action period in the first mold, before a filling and pressure stage.

47. The method of claim 45, wherein there is, simultaneous with molding of the first layer over a core in the first mold, molding of a second layer over a previously molded first layer on a second core in the second mold.

* * * * *

UNITED STATES PATENT AND TRADEMARK OFFICE
CERTIFICATE OF CORRECTION

PATENT NO. : 6,787,094 B2
DATED : September 7, 2004
INVENTOR(S) : Collette et al.

It is certified that error appears in the above-identified patent and that said Letters Patent is hereby corrected as shown below:

Column 22,
Line 3, "claim 1" should read -- claim 43 --.

Signed and Sealed this

Twenty-ninth Day of March, 2005

JON W. DUDAS
*Director of the United States Patent and Trademark Office*